United States Patent
Shirai

Patent Number: 6,080,351
Date of Patent: Jun. 27, 2000

[54] METHOD OF FORMING A MOVING BLOCK OF A ROLLING MOTION GUIDING DEVICE

[75] Inventor: Takeki Shirai, Tokyo, Japan

[73] Assignee: THK Co., Ltd., Tokyo, Japan

[21] Appl. No.: 09/077,755

[22] PCT Filed: Oct. 14, 1997

[86] PCT No.: PCT/JP97/03666

§ 371 Date: Jun. 11, 1998

§ 102(e) Date: Jun. 11, 1998

[87] PCT Pub. No.: WO98/16755

PCT Pub. Date: Apr. 23, 1998

[30] Foreign Application Priority Data

Oct. 14, 1996 [JP] Japan ................................. 8-291161

[51] Int. Cl.$^7$ ............................................. B29C 45/14
[52] U.S. Cl. ................ 264/267; 29/898.12; 164/137; 164/340; 264/242; 264/275; 264/279
[58] Field of Search ................ 264/242, 328.1, 264/318, 267, 269, 275, 276, 279; 425/577, 468; 29/898.12; 384/45

[56] References Cited

U.S. PATENT DOCUMENTS

| | | | |
|---|---|---|---|
| 5,564,188 | 10/1996 | Akasako et al. | 29/898.03 |
| 5,640,768 | 6/1997 | Teramachi | 29/898.03 |
| 5,728,343 | 3/1998 | Ueno | 264/275 |
| 5,755,516 | 5/1998 | Teramachi et al. | 384/45 |
| 5,911,509 | 2/1999 | Kawaguchi et al. | 384/45 |

*Primary Examiner*—Jan H. Silbaugh
*Assistant Examiner*—Dae Young Lee
*Attorney, Agent, or Firm*—Armstrong, Westerman, Hattori, McLeland & Naughton

[57] ABSTRACT

A method of molding a movable block for a rolling motion guide device can effectively prevent the formation of burrs in the rolling member rolling groove and accurately positioning the movable block body in a molding die.

The positioning of the movable block body in width, vertical and longitudinal directions is performed at plain surfaces that are different from the rolling member rolling groove, so that damage or injury of the rolling member rolling groove can be prevented. Further, the molding material is shut off at either both end portions or both side peripheries of the rolling member rolling grooves, so that the molding material can be prevented from invading into the rolling member rolling grooves.

7 Claims, 14 Drawing Sheets

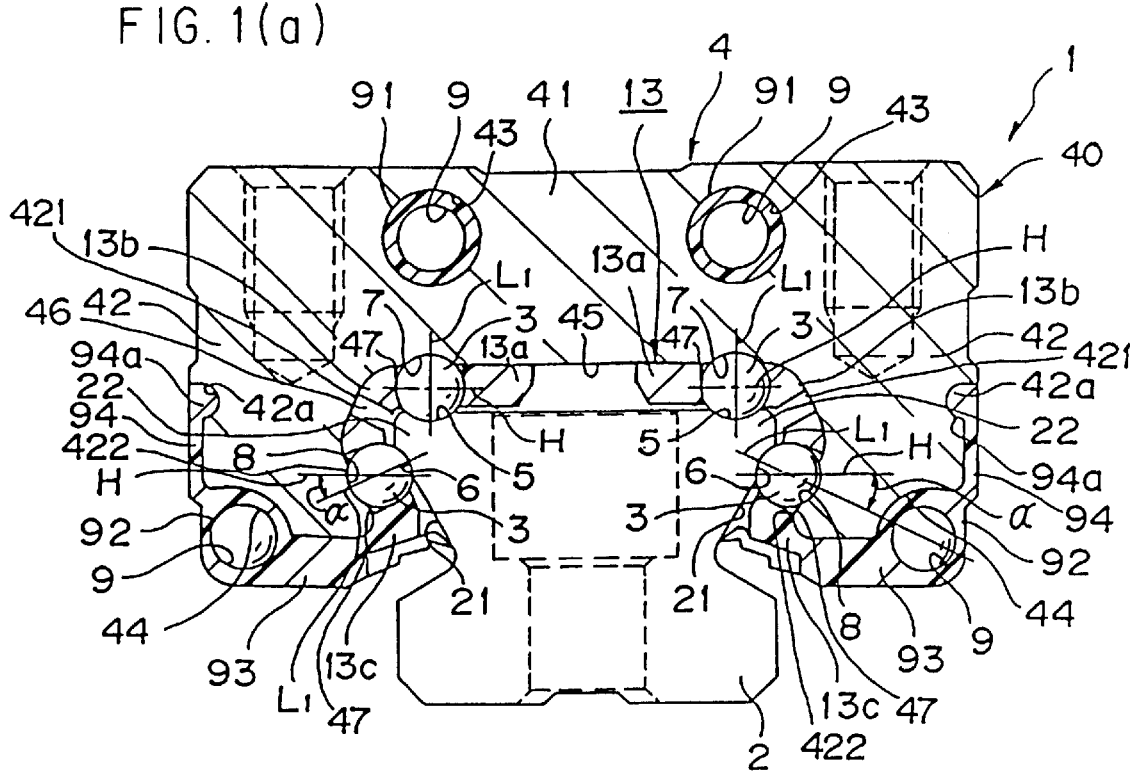
FIG. 1(a)
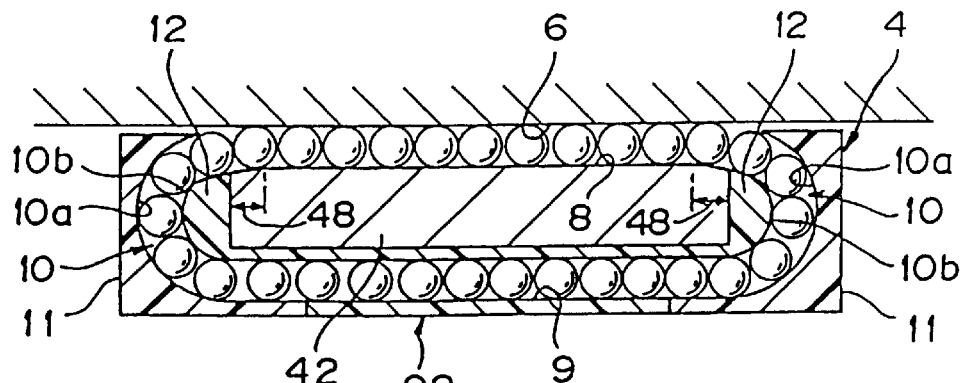
FIG. 1(b)
FIG. 1(c)
FIG. 1(d)
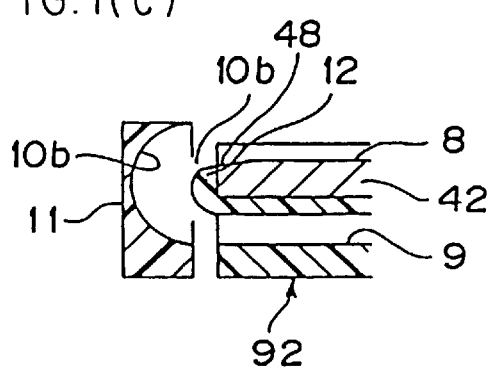

ns6,080,351

METHOD OF FORMING A MOVING BLOCK OF A ROLLING MOTION GUIDING DEVICE

TECHNICAL FIELD

The present invention relates to a method of molding a movable block for a rolling motion guide device in which a movable block is movably assembled to a track rail through rows of rolling members.

BACKGROUND ART

The rolling motion guide device of this type has a structure comprising a track rail formed with rolling member rolling grooves, a movable block provided to the track rail so as to be movable along the track rail, the movable block having a rolling member rolling groove which is opposed to the rolling member rolling groove formed to the track rail, and a row of rolling members (hereinafter referred to simply as "rolling members") disposed between the opposing rolling member rolling grooves formed to the track rail and the movable block.

The applicant of this invention had already proposed a rolling motion guide device in which a movable block is provided with a circulation passage for circulating the row of rolling members and at least part of the circulation passage is constituted as a molded portion (see Japanese Patent Laid-open Publication No. HEI 7-317762).

The molding operation is performed in such a manner that a movable block body is disposed in a molding die, then an integrally-molding is conducted by injecting molding material into a cavity formed between an inner surface of the molding die and the movable block body when the molding die is closed. In this case, conventionally, a supporting portion which engages with the rolling member rolling groove is provided in the molding die, so that the movable block body is positioned with reference to the rolling member rolling groove.

However, in the conventional method of molding the movable block described above, since the rolling member rolling groove is engaged with the supporting portion provided in the molding die, there may be a fear of the rolling member rolling groove being damaged or injured. In order to prevent such damage or injury of the rolling member rolling groove, it may be effective to reduce an engaging force between the supporting portion and the rolling member rolling groove. In this case, however, there may be a fear that the molding material will disadvantageously invade into the rolling member rolling groove and burrs are liable to occur thereto. Further, the positioning of the movable block body will be unstable.

The present invention has been achieved for solving the aforementioned problems encountered in the prior art, and an object of the present invention is to provide a method of molding a movable block for a rolling motion guide device which is capable of effectively preventing the formation of burrs in the rolling member rolling groove and accurately positioning the movable block body.

DISCLOSURE OF THE INVENTION

In order to achieve the aforementioned object, the present invention provides a method of molding a movable block for a rolling motion guide device comprising a track rail formed with rolling member rolling grooves, a movable block having rolling member rolling grooves opposing to the rolling member rolling grooves formed to the track rail, the movable block being movably provided along the track rail and a row of rolling members disposed between the opposing rolling member rolling grooves formed to the track rail and the movable block, wherein a circulation passage for circulating the rows of rolling members is formed to the movable block, at least a part of the circulation passage is constituted by a die-molded portion, and the die-molded portion is integrally molded with a movable block body by an inserting molding method in which the movable block is disposed in a molding die, the method comprising the steps of:

positioning the movable block body in a width direction and in a vertical direction in the molding die by supporting a plain surface having no rolling member rolling groove of the movable block body;

positioning the movable block body in a longitudinal direction by supporting both end surfaces in a longitudinal direction of the movable block body;

preventing a molding material from invading into the rolling member rolling grooves by shutting off the molding material at both ends or both side peripheries of the rolling member rolling grooves; and integrally molding the die-molded portion with the movable block body.

The molding die comprises a block supporting portion for positioning the movable block body in a width direction and in a vertical direction in the molding die by supporting a plain surface having no rolling member rolling groove of the movable block body, for positioning the movable block body in a longitudinal direction by supporting both end surfaces in a longitudinal direction of the movable block body, and for preventing a molding material from invading into the rolling member rolling grooves by shutting off the molding material at both end portions or both side peripheries of the rolling member rolling grooves.

According to the present invention described above, the positioning of the movable block body in width, vertical and longitudinal directions is performed at the plain surface which is different from the rolling member rolling groove, so that the damage or injury of the rolling member rolling groove can be prevented.

In addition, since the molding material is shut off at least at both end portions or both side peripheries of the rolling member rolling grooves, the molding material can be prevented from invading into the rolling member rolling grooves.

Accordingly, the movable block body can be stably positioned by being supported with a large supporting force regardless of the rolling member rolling grooves.

In another aspect of this invention, the method is characterized in that the movable block body comprises a horizontal portion extending in width and longitudinal directions, and a pair of leg portions protruding in a height direction from both the end portions in a width direction of the horizontal portion so as to oppose to side surfaces of the track rail, and in a case where inner side surfaces of the leg portions have inclined surfaces extending toward the protruded portions of the leg portions and gradually inclined toward a side of the track rail, the movable block body is positioned within the molding die in a width direction and in a height direction by supporting at least the inclined surfaces of both the inner side surfaces of both the leg portions and a lower surface of the horizontal portion.

The molding die comprises a block supporting portion for positioning the movable block in a width direction and in a height direction by supporting at least the inclined surfaces of both the inner surfaces of both the leg portions of the movable block body and a lower surface of the horizontal portion.

In this case, a backlash in a height direction of the movable block body is restricted and supported by the inclined surfaces of the inner surfaces of both the leg portions, while a backlash in a width direction of the movable block body is restricted and supported by the inner surfaces of both the leg portions.

In a further aspect of this invention, the method is characterized in that the movable block body comprises a horizontal portion extending in a width direction and a longitudinal direction and a pair of leg portions protruding in a height direction from both the end portions in a width direction of the horizontal portion so as to oppose to side surfaces of the track rail, and in a case where inner side surfaces of the leg portions have an almost vertical surfaces, the movable block body is positioned in a width direction and in a height direction by supporting at least the vertical surfaces of both the inner side surfaces of both the leg portions and both upper and lower surfaces of the horizontal portion.

The molding die comprises a block supporting portion for positioning the movable block body in a width direction and in a height direction by supporting at least the vertical surfaces of both the inner surfaces of both the leg portions and both upper and lower surfaces of the horizontal portion.

In this case, since the inner side surfaces of both the leg portions are vertical surfaces, a backlash in a height direction of the movable block body is restricted and supported by the lower surface of the horizontal portion, while a backlash in a width direction of the movable block body is restricted and supported by the inner surfaces of both the leg portions.

In a still further aspect of this invention, the method is characterized in that the movable block body comprises a horizontal portion extending in a width direction and in a longitudinal direction, and a pair of leg portions protruding in a height direction from both the end portions in a width direction of the horizontal portion so as to oppose to side surfaces of the track rail, and in a case where inner side surfaces of the leg portions have inclined surfaces extending toward the protruded portions of the leg portions and gradually inclined toward a side opposite to the track rail, the movable block body is positioned in a width direction and in a height direction by supporting at least the inclined surfaces of both the inner side surfaces of both the leg portions and an upper surface of the horizontal portion.

The molding die comprises a block supporting portion for positioning the movable block body in a width direction and in a height direction by supporting at least the inclined surfaces of both the inner surfaces of both the leg portions of the movable block body and an upper surface of the horizontal portion.

In this case, a backlash in a height direction of the movable block body is restricted and supported between the inner surfaces of both the leg portions and an upper surface of the horizontal portion, while a backlash in a width direction of the movable block body is restricted and supported by the inner surfaces of both the leg portions.

In a still further aspect of this invention, the method is characterized in that the movable block body comprises a horizontal portion extending in a width direction and in a longitudinal direction, and a leg portion protruding in a height direction from one end portion in a width direction of the horizontal portion so as to oppose to one side surface of the track rail, and in a case where an inner side surface of the leg portion has an almost vertical surface or an inclined surface extending toward a protruded end portion and gradually inclined to a side of the track rail, the movable block body is positioned within the molding die in a width direction and in a height direction by supporting at least both the inner and outer side surfaces of the leg portion and both upper and lower surfaces of the horizontal portion.

The molding die comprises a block supporting portion for positioning the movable block body in a width direction and in a height direction by supporting at least both the inner and outer side surfaces of the leg portion and both upper and lower surfaces of the horizontal portion.

In a case where the inner side surface of the leg portion is a vertical surface, a backlash in a height direction of the movable block body is restricted and supported by both the upper and lower surfaces of the horizontal portion, while a backlash in a width direction of the movable block body is restricted and supported by both the inner and outer side surfaces of the leg portion.

In a case where the inner side surface of the leg portion is an inclined surface, a backlash in a height direction of the movable block body is restricted and supported by both the upper and lower surface of the horizontal portion.

In a still further aspect of this invention, the method is characterized in that the positioning in a longitudinal direction of the movable block body in the molding die is performed by supporting a direction changing guide portion formed to both end portions of the rolling member rolling groove of the movable block body.

The molding die comprises a block supporting portion for positioning the movable block body in a longitudinal direction by supporting the direction changing guide portion formed to both end portions of the rolling member rolling groove of the movable block body.

The direction changing guide portion is provided for allowing the rolling members to smoothly change the rolling direction of the rolling members such that a load is gradually applied to the rolling members when the rolling members are moved from a non-loaded region to a loaded region. When the movable block body is positioned with reference to this direction changing guide portion, the positioning of the movable block body and the shutting off the molding material can be performed simultaneously.

In a still further aspect of this invention, the method is characterized in that the circulation passage comprises the rolling member rolling groove to be formed to the movable block, a rolling member return passage to be formed in parallel to the rolling member rolling groove, and a direction changing passage for connecting the rolling member rolling groove to the rolling member return passage, wherein the die molded portion constitutes at least one of a rolling member retaining portion to be formed at both side peripheries of the rolling member rolling groove, a return passage forming portion for forming the rolling member return passage, and a direction changing inner peripheral guide forming portion for forming an inner peripheral portion of the direction changing passage.

The position of the movable block body in the molding die is accurately determined, so that the boundary portion between the end portion of the rolling member rolling groove formed to the movable block and the direction changing passage inner peripheral portion can be formed without causing irregularities.

Further, in a case where the rolling member return passage and the movable block body are integrally molded, a location of the rolling member return passage with respect to the movable block body can be accurately made.

Furthermore, in a case where the rolling member retaining portion and the movable block body are integrally molded, a location of the rolling member retaining portion with respect to the rolling member rolling groove can be accurately made.

In addition, when both the rolling member returning passage and the direction changing passage inner periphery guide portion are integrally formed with the movable member, the joint portion between the rolling member returning passage and the direction changing inner periphery guide portion can be molded so as to provide a continuous surface without causing irregularities.

In a case where the direction changing passage inner periphery guide portion and the rolling member retaining portion are integrally formed, the joint portion between the rolling member retaining portion and the direction changing inner periphery guide portion can be molded without causing irregularities.

In addition, in a case where all of the rolling member retaining portion, the direction changing passage inner periphery guide portion and the rolling member returning passage are integrally molded with the movable block body, each of the joint portions to be formed at an entire circumference of the circulation passage can be molded without causing irregularities.

BRIEF DESCRIPTION OF THE DRAWINGS

FIG. 1 is a view showing a first embodiment of a rolling motion guide device according to the present invention, in which FIG. 1(a) is a cross sectional view taken along the plane orthogonal to the track rail, FIG. 1(b) is a view showing a structure of a ball circulating passage, FIG. 1(c) is a partially exploded sectional view showing a direction changing passage, and FIG. 1(d) is a sectional view showing a ball retaining portion.

FIG. 2 is a view showing a first embodiment of a rolling motion guide device according to the present invention, in which

FIG. 3 is a view showing a method of molding the movable block, in which

FIG. 4 is a view showing a second embodiment of a rolling motion guide device according to the present invention, in which

FIG. 5 is a view showing a second embodiment of a rolling motion guide device according to the present invention, in which

FIG. 6 is a view showing a second embodiment of the method of molding the movable block according to the present invention, in which

FIG. 7 is a view showing a third embodiment of a rolling motion guide device according to the present invention, in which

FIG. 8 is a view showing a third embodiment of the method of molding the movable block according to the present invention, in which

FIG. 9 is a view showing a fourth embodiment of a rolling motion guide device according to the present invention, in which

FIG. 10 is a view showing a fourth embodiment of a rolling motion guide device according to the present invention, in which

FIG. 11 is a view showing a fourth embodiment of the method of molding the movable block according to the present invention, in which

FIG. 12 is a view showing a fifth embodiment of a rolling motion guide device according to the present invention, in which

FIG. 13 is a view showing a fifth embodiment of a rolling motion guide device according to the present invention, in which

FIG. 14 is a view showing a molding die used in the fifth embodiment of the method of molding the movable block according to the present invention, in which

BEST MODE FOR EMBODYING THE INVENTION

In order to explain the present invention in more detail, the preferred embodiments of this invention will be described hereunder with reference to the accompanying drawings.

First Embodiment

Figure 2A:
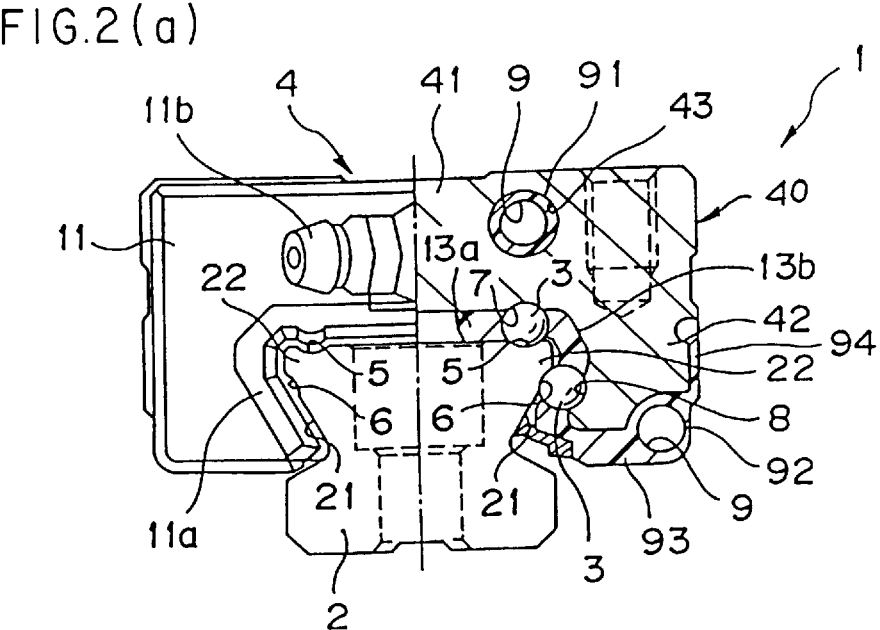
FIG. 2(a) is a front view of a half-sectioned movable block and FIG. 2(b) is a side view of a half sectioned movable block.
Figure 2B:
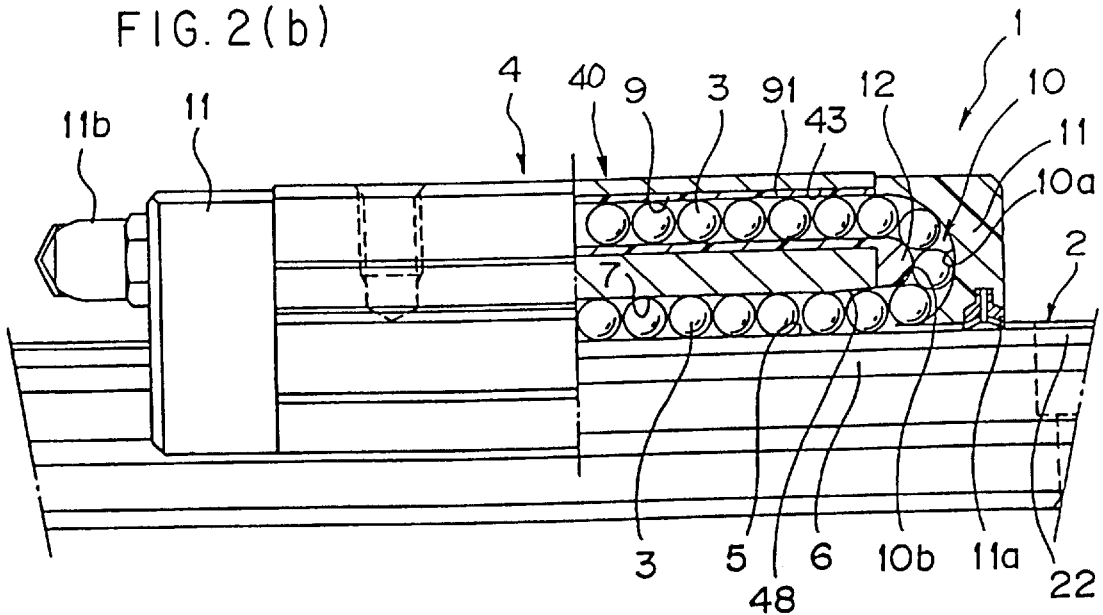

FIGS. 1 and 2 show a first embodiment of a rolling motion guide device according to the present invention.

As shown in FIG. 1(a), the rolling motion guide device 1 is constructed by comprising a track rail 2 and a movable block 4 having a U-shape in section and movably supported by the track rail 2 through four rows in total of balls 3 in which two rows of balls are disposed to an upper surface side of the track rail 2 while one row of balls is disposed to each of right and left side surfaces of the track rail 2.

The track rail 2 is an elongated member formed to provide a rectangular shape in section. Upper half portions of both right and left side surfaces of the track rail 2 are formed to provide tapered surfaces 21 so that the upper half portions gradually protrude outside as position advances upward. Each of the right and left tapered surfaces 21 is formed with one row of ball rolling groove as a rolling member rolling groove, respectively. In contrast, an upper surface of the track rail 2 is a plain surface and each of both right and left end portions thereof is formed with one row of ball rolling groove 5, two rows in total.

The movable block 4 is a block body having a high rigidity and a U-shaped cross section, and has a movable block body 40 comprising a horizontal portion 41 opposing to the upper surface of the track rail 2 and a pair of leg portions 42 and 42 extending downward from both right and left side end portions of the horizontal portion 41 so as to clamp both the right and left side surfaces of the track rail 2. At the lower surface of the horizontal portion 41 is formed with a pair of ball rolling grooves 7 and 7 corresponding to the paired ball rolling grooves 5 and 5 formed to the upper surface of the track rail 2, while the inner side surfaces of both the right and left leg portions 42 and 42 are formed with ball rolling grooves 8, 8 corresponding to the ball rolling grooves 6, 6 formed to the right and left side surfaces of the track rail 2.

The right and left leg portions 42 and 42 comprise outwardly directing inclined surfaces 421 each obliquely extending toward the protruded end portions so as to be gradually apart from the track rail 2 and comprise inwardly directing inclined surfaces 422 each obliquely extending in a direction so as to be close to the track rail 2. The inwardly directing inclined surfaces 422 are formed with ball rolling grooves 7 and 7.

The ball rows for receiving loads to be applied between the track rail 2 and the movable block 4 are constituted by disposing a number of balls 3 to portions between the four paired ball rolling grooves 5, 7; 6, 8 that mutually correspond to each other and are formed to the opposing surfaces of the movable block 4 and the track rail 2. The balls 3 are applied with a predetermined preload. As the rolling member other than balls, rollers or the like may be also applicable.

Both end portions of the ball rolling grooves 7, 8 are performed with a crowning-working so as to provide a ball guide portion 48 having an inclination of which depth gradually increases toward the end portions of the ball rolling grooves. The ball guide portion 48 has a function of rolling and moving the balls from the direction changing passage 10 in a non-loaded region to portions between the ball rolling grooves 5, 7; 6, 8 in a loaded region by gradually applying the load to the balls.

With respect to the balls 3 disposed between the upper surface of the track rail 2 and the horizontal portion 41 of the movable block body 40, a contact angle line L1 connecting contact points of the respective balls to the ball rolling grooves 5, 7; 6, 8 is set to almost about 90° with respect to a horizontal line H passing through a center of the ball 3. In contrast, with respect to the balls 3 disposed between the right and left side surfaces of the track rail 2 and the right and left leg portions 42, 42 of the movable block body 40, a contact angle line L1 connecting contact points of the respective balls to the ball rolling grooves is set to upwardly incline with a predetermined angle of α with respect to a horizontal line H passing through a center of the ball 3 so as to extend toward a center of the track rail 2. As a result, the balls have a structure that both the upper end right and left corner portions 22, 22 of the track rail 2 are clamped by the two rows of balls 3 disposed to the right and left side surfaces and the two rows of balls 3 disposed to the upper surface of the track rail 2.

The movable block 4 is provided with four rows of ball returning passages 9 for circulating and guiding the four rows of balls 3. The ball returning passage 9 is constituted by a bore linearly extending in parallel to the respective ball rolling grooves 7, 8 formed to the movable block 4. Two rows of the ball returning passages are formed to the horizontal portion 41, while two rows of the ball returning passages are formed to each of the right and left leg portions 42, respectively.

The horizontal portion 41 of the movable block 4 is formed with a large-diameter through bore 43 having a diameter larger than that of a cross sectional area of the ball returning passage 9. A first pipe portion 91 composed of resin as return passage forming member for forming the ball returning passage 9 is integrally bonded to an inner periphery of the through bore 43.

On the other hand, outer side surface lower end corner portions of the right and left leg portions 42 of the movable block body 40 are formed with a concave portion 44 to which a second pipe portion 92 composed of resin for forming the ball returning passage 9 is integrally bonded. The second pipe portion 92 is formed to be continuous to a thickened lower end surface resin portion 93 covering a lower end surface of the leg portion 42 and to a side surface resin portion 94 covering an outer side surface lower end portion of the leg portion 42. An upper end of the side surface resin portion 94 is formed with an engaging projection 94a which engages with an engaging groove 42a formed to an outer side surface of the leg portion 42.

As shown in FIGS. 1(b), (c) and FIG. 2, a side cover 11, constituting the direction changing passage 10 in a U-shaped-pipe form for changing the direction of the balls 3 disposed between the track rail 2 and the movable block body 40 toward the ball returning passage 9, is attached to an end portions of the movable block body 40. The side cover 11 per se is formed with only an outer peripheral portion 10a among the entire direction changing passage 10 in the U-shaped pipe form. Further, a direction changing passage inner peripheral piece portion 12 as a direction changing inner periphery forming member for forming an inner peripheral portion 10b of the direction changing passage 10 is integrally bonded to the end portions of the movable block body 40, and the direction changing passage 10 is constituted by the side covers 11 and the direction changing inner peripheral piece portions 12. In this regard, the reference numeral 11a in figures denotes an end seal for sealing a gap formed between the track rail 2 and the side cover 11 and a reference numeral 11b denotes a grease nipple.

In addition, as shown in FIG. 1(a), the movable block 4 is provided with ball retaining members 13 along the four rows of balls 3 for preventing the balls 3 from dropping off from the movable block 4 when the movable block 4 is detached from the track rail 2. The ball retaining members 13 are composed of resin and comprises a first retainer portion 13a integrally bonded to the lower surface of the horizontal portion 41 of the movable block body 40, right and left second retainer portions 13b integrally bonded to a concave corner portion between the horizontal portion 41 and the right and left leg portions 42, and right and left third retainer portions 13c integrally bonded to the inner surface lower end portions of the right and left leg portions 42. The third retainer portions 13c are formed to be continuous to the lower end covering portion 93 covering the lower end portion of the leg portion 42 and integrally formed to the second pipe portion 92.

The two rows of balls 3 disposed to upper surface of the track rail 2 are retained between both the right and left end portions of the first retainer portion 13a and the upper end portion of the second retainer portion 13b, while the right and left two rows of balls 3 disposed to the right and left side surfaces of the track rail 2 are retained between the right and left second retainer portions 13b and the third retainer portion 13c.

The first retainer portion 13a and the second retainer portion 13b are provided with first and second concave portions 45, 46 at which the lower surface of the horizontal portion 41 and the inwardly directing inclined surfaces 422 of the inner side surfaces of the movable block body 40 are exposed. The first and second concave portions 45, 46 are formed to have a shape corresponding to a convex portion for supporting the movable block body 40 within the molding die at the time of the insert molding operation. The first and second concave portions 45, 46 can be continuously formed to the movable block body 40 over an entire length thereof or can also be discontinuously and partially formed to the movable block body 40.

On the other hand, as shown in FIG. 1(d), at periphery portions of the first to third retainer portion 13a–13c contacting to the ball rolling grooves 7, 8, a plain portion 47 is exposed to a portion between side peripheries of the ball rolling grooves 7, 8. The convex portion for preventing the molding material from penetrating into the ball rolling grooves 7, 8 at the time of the insert molding operation is abutted against the plain portion 47.

In addition, all of the first and second pipe portions 91, 92 as the return passage forming member, the first to third retainer portions 13a, 13b as the ball retaining member 13 and the direction changing inner peripheral piece portion 12 is composed of a die-molded portion which is integrally molded with the movable block body 40.

This integral molding is performed in accordance with an insert molding method in which a cavity corresponding to the die molded portion to be formed is formed between an inner wall of the molding die 14 and the movable block body 40 by disposing the movable block body 40 within a molding die 14 with reference to the ball rolling groove 7 formed to the movable block body 40, and then the molding material is injected into the cavity.

FIG. 3 includes schematic views showing states where the movable block body 40 and the molding die 14 are closed or opened at the time of the insert molding operation.

A fixed die 14a comprises a first convex portion 14a1 abutting against the lower surface as the plain surface of the horizontal portion 41 of the movable block 40, a second convex portion 14a2 abutting against the outwardly directing inclined surface 421 of the inner side surface of the leg portion 42, a third convex portion 14a3 for shutting off the molding material by abutting against the plain portion 47 of the side periphery of the ball rolling grooves 7, 8 formed to the lower surface of the horizontal portion 41, and a fourth convex portion 14a4 abutting against the plain portion 47 of the side periphery of the ball rolling grooves 8 formed to the inwardly directing inclined surface 422 of the inner side surface.

The first convex portion 14a1 and the second convex portions 14a2 are not required to be continuously formed to the movable block body 40 over an entire length thereof, and the convex portions can also be discontinuously formed to the movable block body 40. However, the third convex portion 14a3 and the fourth convex portions 14a4 are required to be continuously formed to the movable block body 40 over an entire length of the ball rolling grooves 7, 8.

On the other hand, a movable die 14c is provided with a pin 14d for forming the ball returning passage 9.

Figure 3A:
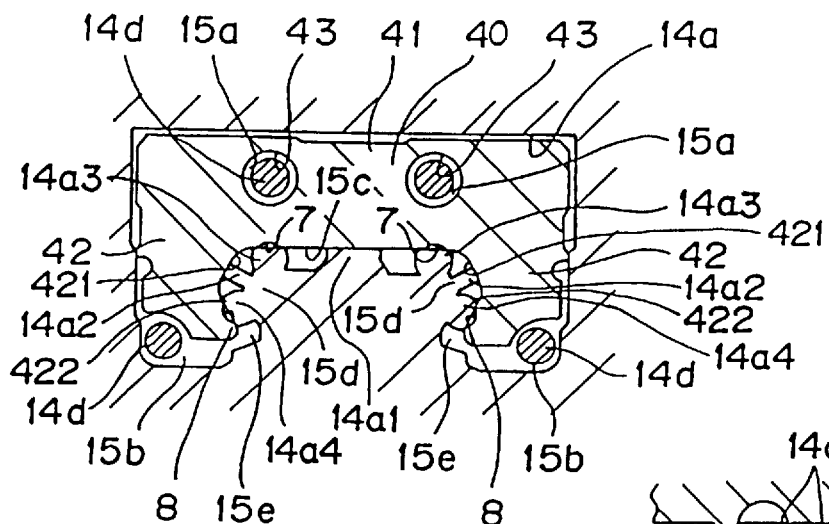
FIG. 3(a) is a cross sectional view of a fixed molding-die to which the movable block body is inserted.
Figure 3E:
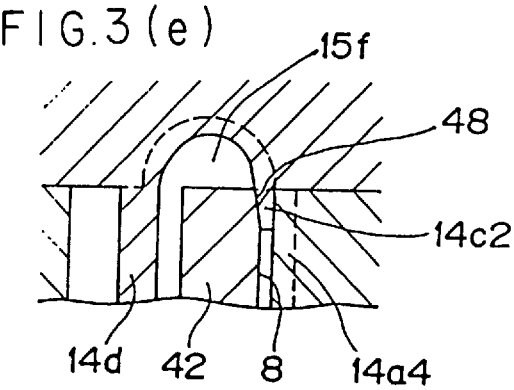
FIG. 3(e) is a schematically and partially cross sectional view showing a state where the molding material is shut off at both ends of the ball rolling groove.
Figure 3B:
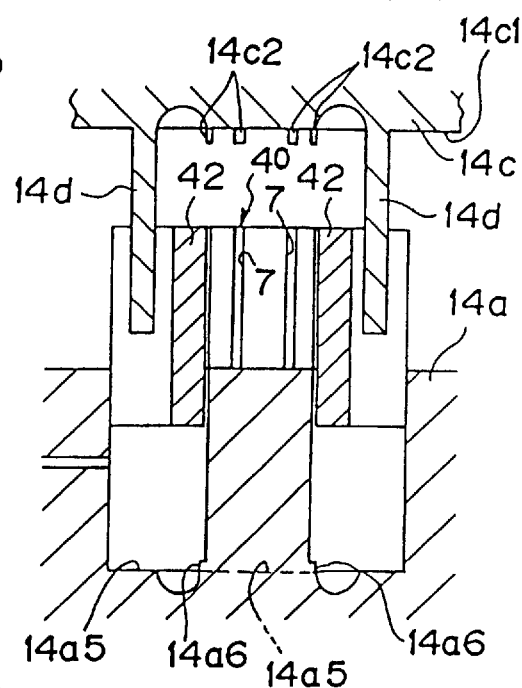
FIG. 3(b) is a longitudinal sectional view showing a molding die in an opened-state.
Figure 3C:
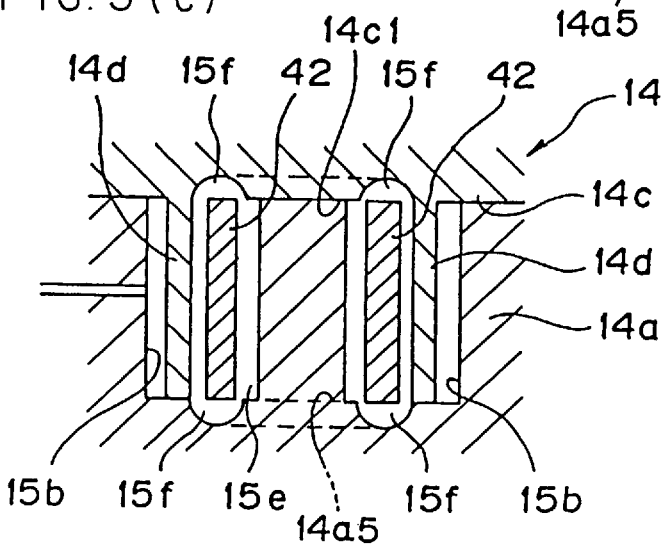
FIG. 3(c) is a longitudinal sectional view showing a molding die in a closed-state.

Note, FIGS. 3(b), (c) show only a circumference of the ball returning passage 9 formed to the side of the leg portion 42.

Further, a cavity 15a for forming the first pipe portion 91 is provided in the through bore 43 formed to the horizontal portion 41 of the movable block body 40, a cavity 15b for forming the second pipe portion 92 is provided in an outer side of the concave portion formed an outer corner portion of the leg portion 42, cavities 15c–15e for forming the first to third retainer portions 13a–13c are provided at the horizontal portion 41 and inner circumferences of the leg portion 42, and a cavity 15f for forming the direction changing passage inner peripheral piece portion 12 is provided at both front and rear end portions of the movable block body 40, respectively.

The first convex portion 14a1 and the second convex portions 14a2 are projected into the cavities 15c, 15d, respectively, and abut against the lower surface of the horizontal portion 41 of the movable block body 40 and the outwardly directing inclined surface 421 of the inner side surface of the leg portion 42, the lower surface and the inclined surface 421 being plain surfaces other than a surface having the ball rolling grooves 7, 8. Further, the third convex portion 14a3 abuts against the side periphery of the ball rolling grooves 7, 8 formed to the horizontal portion 41, while the fourth convex portion 14a4 abuts against the inwardly directing inclined surface 422 of the inner side surface of the leg portion 42, whereby a position of the movable block body 40 in a width and height directions is determined.

That is, a backlash in a height direction of the movable block body 40 is restricted and supported by the first convex portion 14a1 abutting against the lower surface of the horizontal portion 41, the second convex portion 14a2 abutting against the outwardly directing inclined surfaces 421 of the inner surfaces of both the leg portions 42, and the third and fourth convex portions 14a3, 14a4. While, a backlash in a width direction of the movable block body 40 is restricted and supported by the second to fourth convex portions 14a2–14a4.

Figure 3D:
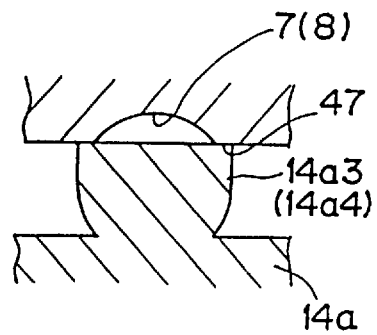
FIG. 3(d) is a view showing a state where the molding material is shut off at side peripheries of the ball rolling groove.

In addition, as shown in FIG. 3(d), by the action of the third and fourth convex portions 14a3 and 14a4, the molding material such as resin material or the like can be prevented from invading into the ball rolling grooves 7, 8 formed to the movable block body 40.

On the other hand, the position of the movable block body 40 in a longitudinal direction is determined by a bottom wall 14a5 of the fixed die 14a and an end wall 14c1 of the movable die 14c against which both end portions in a longitudinal direction of the movable block body 40 are abutted.

As shown in FIGS. 3(b), (e), the shutting-off the molding material between the both end portions of the ball rolling grooves 7, 8 and the direction changing inner peripheral piece portion 12 can be performed by the engaging convex portions 14a6, 14c2 to be engaged with the ball guide portion 48 subjected to a crowning working and provided to both end portions of the ball rolling grooves 7, 8.

According to the present invention described above, the positioning of the movable block body 40 in width, vertical and longitudinal directions is performed at the plain surface which is different from the ball rolling grooves 7, 8, so that the damage or injure of the ball rolling grooves 7, 8 can be prevented. Further, the movable block body 40 can be stably positioned by being supported with a large supporting force regardless of the ball rolling grooves 7, 8.

Accordingly, the positions of the cavity 15a for forming the first pipe portion 91, the cavity 15b for forming the second pipe portion 92, the cavities 15c–15e for forming the first to third retainer portions 13a–13c and the cavity 15f for forming the direction changing passage inner peripheral piece portion 12 with respect to the movable block 4 can be accurately determined. As a result, there is no fear of causing irregularities due to assembling errors at a joint portion formed between the direction changing passage inner peripheral piece portion 12 and the ball rolling grooves 7, 8 and at a joint portion between the direction changing passage inner peripheral piece portion 12 and the ball returning passages 9 to be formed of the first and second pipe portions 91, 92, so that it becomes possible to smoothly circulate the balls 3, and to reduce the noise generation.

By the way, in order to prevent the generation of burr, it is not always necessary to completely or tightly contact the respective members such as the plain portion 47 of the side periphery of the ball rolling grooves 7, 8 formed to the movable block body 40 and the third and fourth convex portions 14a3, 14a4; or the engaging convex portions 14a6, 15c2 and each of the ball guide portions 48. Even if a gap is formed between the members, such gap is within an allowable range as far as the gap has a size capable of preventing the invasion of the molding material.

In the present embodiment, although all of the first and second pipe portions 91, 92 as the ball returning passage forming member, the first, second and third retainer portions 13a–13c as the ball retaining member, and the direction changing passage inner peripheral piece portion 12 as the direction changing passage inner peripheral portion forming member is integrally formed with the movable block body 40 by the insert molding method to form a die-molded portion, there may be also applicable a method in which at least one of the aforementioned members is integrally molded by the insert molding method.

That is, there will be applicable various cases e.g., a case where only the first and second pipe portions 91, 92 are integrally molded, a case where only the first to third retainer portions 13a–13c are integrally molded, a case where only the direction changing passage inner peripheral piece portion 12 is integrally molded, a case where the first and second pipe portions 91, 92 and the first to third retainer portions 13a–13c are integrally molded, a case where the first to third retainer portions 13a–13c and the direction changing passage inner peripheral piece portion 12 are integrally molded, a case where the first and second pipe portions 91, 92 and the direction changing passage inner peripheral piece portion 12 are integrally molded.

Second Embodiment

Figure 4A:
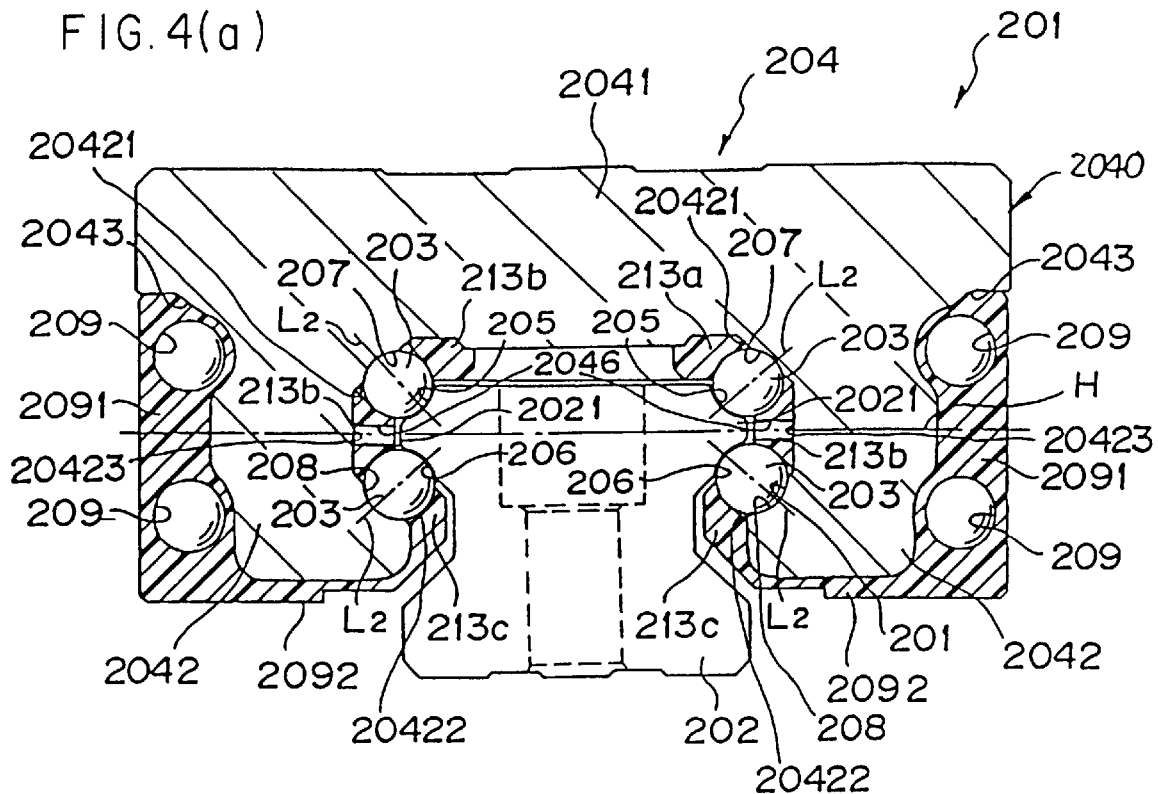
FIG. 4(a) is a cross sectional view taken along a plane orthogonal to the track rail.
Figure 4B:
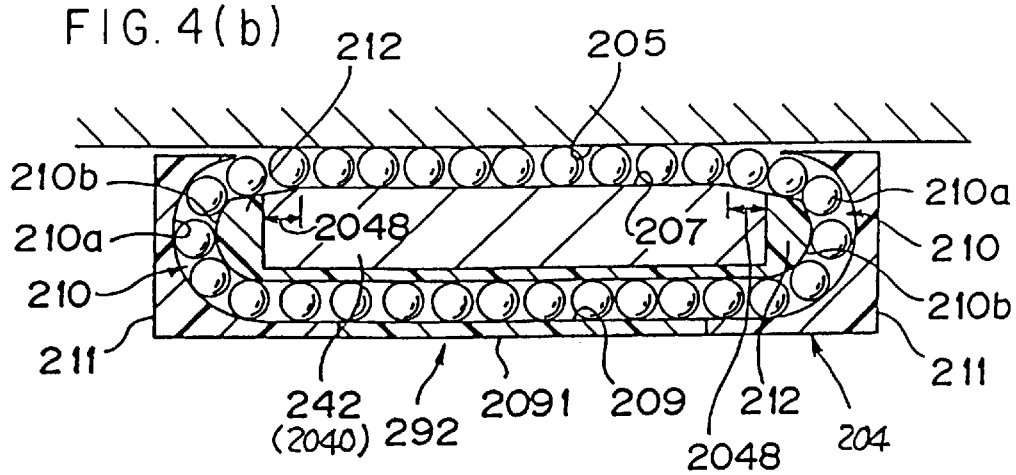
FIG. 4(b) is a view showing a structure of a circulation passage.
Figure 4C:
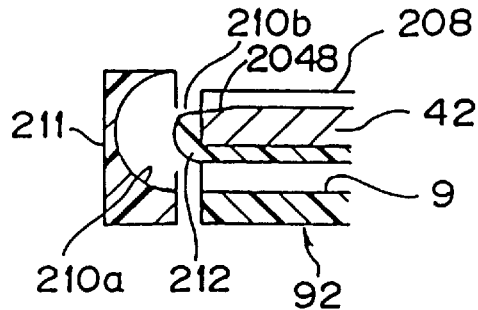
FIG. 4(c) is a partially exploded sectional view showing a direction changing passage.
Figure 5A:
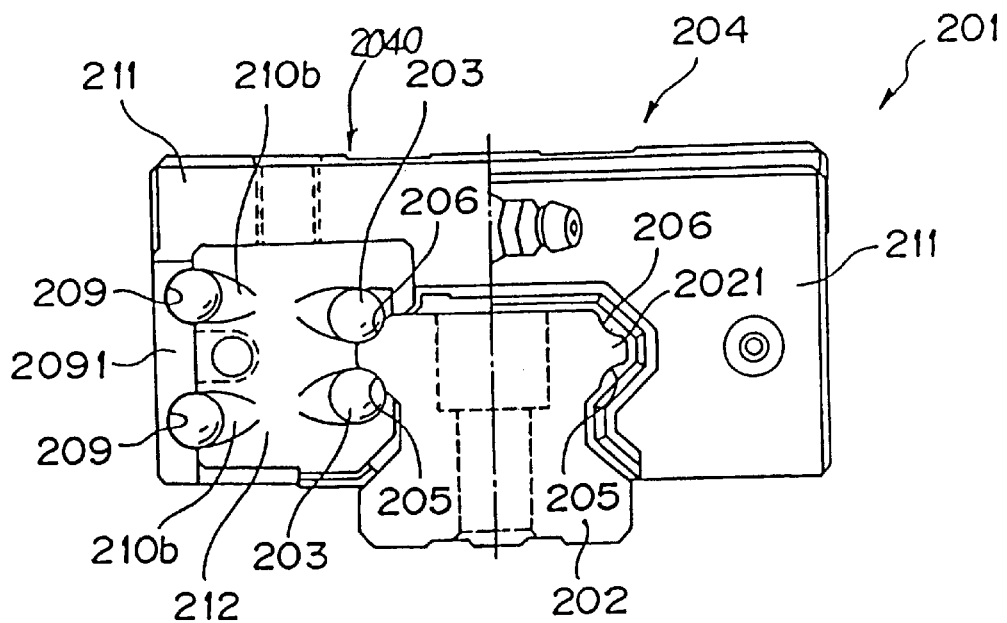
FIG. 5(a) is a front view of a side cover of the movable block of which half portion is omitted and FIG. 5(b) is a side view showing the movable block.
Figure 5B:
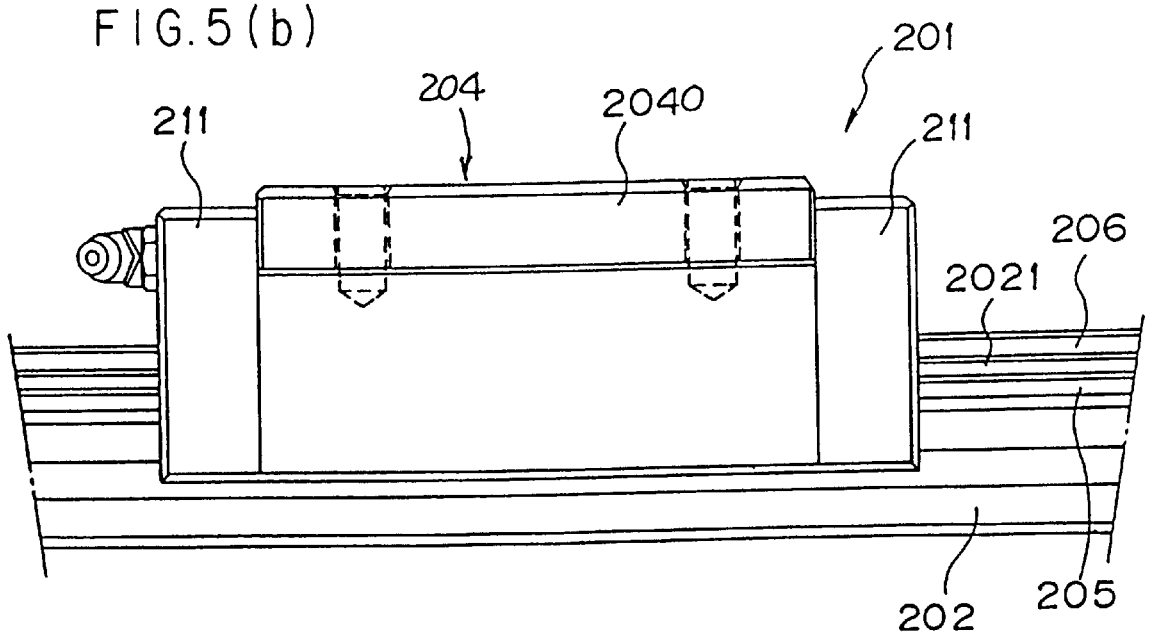

FIG. 4 shows a second embodiment of a rolling motion guide device according to the present invention.

The rolling motion guide device 201 is constructed by comprising a track rail 202 and a movable block 204 having a U-shape in section and movably supported by the track rail 202 through four rows, in total, of balls 203 in which two rows of balls are vertically disposed to each of the right and left side surfaces of the track rail 202.

The track rail 202 is an elongated member formed to provide a rectangular shape in section. Both right and left side surfaces of the track rail 202 are provided with protruded portions 2021 each protruding outside. Each of upper and lower side surfaces of the right and left protruded portions 2021 is formed with rows of ball rolling grooves 205, 206 as the rolling member rolling grooves.

The movable block 204 is a block body having a high rigidity and a U-shaped cross section and has a movable block body 2040 comprising a horizontal portion 2041 opposing to the upper surface of the track rail 202 and a pair of leg portions 2042 and 2042 extending downward from both right and left side end portions of the horizontal portion 2041 so as to clamp both the right and left side surfaces of the track rail 202. The inner side surfaces of the right and left leg portions 2042 have a vertical surfaces 20423 each extending in an almost vertical direction, outwardly directing inclined surfaces 20421 formed at base portions of the right and left leg portions 2042, and inwardly directing inclined surfaces 20422 formed at top portions of the leg portions 2042.

The outwardly directing inclined surfaces 20421 and the inwardly directing inclined surfaces 20422 are formed with two rows of ball rolling grooves 207 and 208 corresponding to the paired ball rolling grooves 205 and 206 formed to the right and left side surfaces of the track rail 202.

The ball rows for receiving loads to be applied between the track rail 202 and the movable block body 2040 are constituted by disposing a number of balls 203 to portions between the four paired ball rolling grooves 205, 208; 206, 207 that mutually correspond to each other and are formed to the opposing surfaces of the movable block body 2040 and the track rail 202. The balls 203 are applied with a predetermined preload. As the rolling member other than balls, rollers or the like can be also applied.

Both end portions of the ball rolling grooves 207, 208 are performed with a crowning-working so as to provide a ball guide portion 2048 having an inclination of which depth gradually increases toward the end portions of the ball rolling grooves. The ball guide portion 2048 has a function of rolling and moving the balls from the direction changing passage 210 in a non-loaded region to portions between the ball rolling grooves 205, 207; 206, 208 in a loaded region by gradually applying the load to the balls.

Contact angle lines each connecting contact points of the respective balls 203 to the ball rolling grooves 205, 208; 206, 207 have an inclined structure so as to be close toward a center of the track rail 202, and the contact angle is set to almost about 45° with respect to a horizontal line H.

The right and left leg portions 2042 of the movable block body 2040 are provided with four rows of ball returning passages 209 for circulating and guiding the four rows of balls. The ball returning passage 209 is constituted by a bore linearly extending in parallel to the respective ball rolling grooves 207, 208 formed to the movable block body 2040.

The outer side surfaces of the right and left leg portions 2042 of the movable block body 2040 are formed with a cutout portion 2043. A return passage forming member 2091 composed of resin for forming the ball returning passage 209 is integrally bonded to the cutout portion 2043. Upper and lower two rows of the ball returning passage 209, 209 are formed to the return passage forming member 2091.

The return passage forming member 2091 is formed to be continuous to an end surface resin portion 2092 covering a lower end surface of the leg portion 2042.

A side cover 211 constituting the direction changing passage 210, in a U-shaped-pipe form for changing the direction of the balls 203 disposed between the track rail 202 and the movable block body 2040 toward the ball returning passage 209, is attached to an end portions of the movable block body 2040. The side cover 211 per se is formed with only an outer peripheral portion 210*a* of the entire direction changing passage 210 in the U-shaped pipe form. Further, a direction changing passage inner peripheral piece portion 212 as a direction changing inner periphery forming member for forming an inner peripheral portion 210*b* of the direction changing passage 210 is integrally bonded to the end portions of the movable block body 2040, and the direction changing passage 210 is constituted by the side covers 211 and the direction changing inner peripheral piece portions 212.

In addition, the movable block body 2040 is provided with ball retaining members 213 along the four rows of balls 203 for preventing the balls 203 from dropping off from the movable block 204 when the movable block 204 is detached from the track rail 202. The ball retaining members 213 are composed of resin and comprises a first retainer portion 213*a* integrally bonded to the lower surface of the horizontal portion 2041, right and left second retainer portions 213*b* integrally bonded to an inner side surface center portion of the right and left leg portions 242, and right and left third retainer portions 213*c* integrally bonded to the inner surface lower end portions of the right and left leg portions 242. The third retainer portions 213*c* is formed to be continuous to the lower end covering portion 2092 covering the lower end portion of the leg portion 242 and integrally formed to the ball returning passage forming member 2091.

The upper side two rows of balls 203 are retained between both the right and left end portions of the first retainer portion 213*a* and the upper end portion of the second retainer portion 213*b*, while the right and left two rows of balls 203 disposed to the right and left side surfaces of the track rail 202 are retained between the right and left second retainer portions 213*b* and the third retainer portion 213*c*.

The second retainer portion 213*b* is provided with a second concave portion 2046 at which the vertical surface of the inner side surface of the leg portion 242 is exposed. The second concave portion 2046 is formed to have a shape corresponding to a convex portion for supporting the movable block body 2040 within the molding die 214 at the time of the insert molding operation. The second concave portions 2046 can be continuously formed to the movable block body 2040 over an entire length thereof or can also be discontinuously and partially formed to the movable block body 2040.

On the other hand, at periphery portions of the first to third retainer portion 13*a*–13*c* contacting to the ball rolling grooves 207, 208, plain surfaces of the outwardly and inwardly directing inclined surfaces 20421, 20422 are exposed to a portion between side peripheries of the ball rolling grooves 207, 208. The outwardly and inwardly directing inclined surfaces 20421, 20422 each having a plain surface becomes shutting-off surfaces for preventing the molding materials such as resin material or the like from penetrating into the ball rolling grooves 207, 208 at the time of the insert molding operation.

In addition, all of the aforementioned return passage forming member 209, the first to third retainer portions 213*a*–213*c* as the ball retaining member 213 and the direction changing inner peripheral piece portion 212 is integrally molded with the movable block body 2040.

This integral molding is performed in accordance with an insert molding method in which a cavity corresponding to the resin molded portion to be formed is formed between an inner peripheral wall of the molding die 214 and the movable block body 2040 by disposing the movable block body 2040 within a molding die 214, and then, the molding material is injected into the cavity.

FIG. 6 is a schematic view showing an engaging state of the movable block body 2040 with the molding die 214 at the time of the insert molding operation.

A fixed die 214*a* comprises a first convex portion 214*a*1 abutting against the lower surface of the horizontal portion 2041 of the movable block body 2040, a second convex portion 214*a*2 abutting against the vertical surface 20423 of the inner side surface of the leg portion 2042, a third convex portion 214*a*3 for shutting off the molding material by abutting against the outwardly directing inclined surface 20422, and a fourth convex portion 214*a*4 for shutting off the molding material by abutting against the inwardly directing inclined surface 20422.

The first convex portion 214*a*1 and the second convex portions 214*a*2 are not required to be continuously formed to the movable block body 2040 over an entire length thereof, and the convex portions can also be discontinuously formed to the movable block body 2040. However, the third convex portion 214*a*3 and the fourth convex portions 214*a*4 are required to be continuously formed to the movable block body 2040 over an entire length of the ball rolling grooves 207, 208.

A movable die 214*c* is provided with a pin 214*d* for forming the ball returning passage 209.

Further, a cavity 215*a* for forming the return passage forming member 2091 is provided at the cutout portions 2043 of outer side surfaces of the right and left leg portions 2042, cavities 215*b*–215*d* for forming the first to third retainer portions 213a–213c are provided at the horizontal portion 241 and inner circumferences of the leg portion 242, and a cavity 215e for forming the direction changing passage inner peripheral piece portion 212 is provided at both front and rear end portions of the movable block body 2040, respectively.

The first convex portion 214a1 is projected into the right and left cavities 215b while the second convex portions 214a2 is projected into the cavities 215c, respectively, and the convex portions abut against the lower surface of the horizontal portion 2041 of the movable block body 2040 and the vertical surface 20423 of the inner side surface of the leg portion 2042, the lower surface and the vertical surface being plain surfaces other than a surface having the ball rolling grooves 207, 208. Further, the third convex portion 214a3 abuts against the side periphery of the ball rolling grooves 207 formed to the horizontal portion 2041, while the fourth convex portions 214a4 abuts against the inwardly directing inclined surface 20422 of the inner side surface of the leg portion 2042, whereby a position of the movable block body 2040 in a width and height directions is determined.

That is, a positioning in a height direction of the movable block body 2040 is performed by the first convex portion 214a1 abutting against the lower surface of the horizontal portion 2041, and the third and fourth convex portions 214a3, 214a4 abutting against the outwardly and inwardly directing inclined surfaces 20421, 20422 of the inner side surfaces of both the leg portions 2042. While, a positioning of the movable block body 2040 in a width direction is performed by the second to fourth convex portions 214a2–214a4.

In addition, by the action of the third and fourth convex portions 214a3 and 214a4, the molding material such as resin or the like can be prevented from invading into the ball rolling grooves 207, 208 formed to the movable block body 2040.

On the other hand, the position of the movable block body 2040 in a longitudinal direction is determined by a bottom wall 214a5 of the fixed die 214a and an end wall 214c1 of the movable die 214c against which an elongated end wall in a longitudinal direction of the movable block body 2040 are abutted.

Figure 6A:
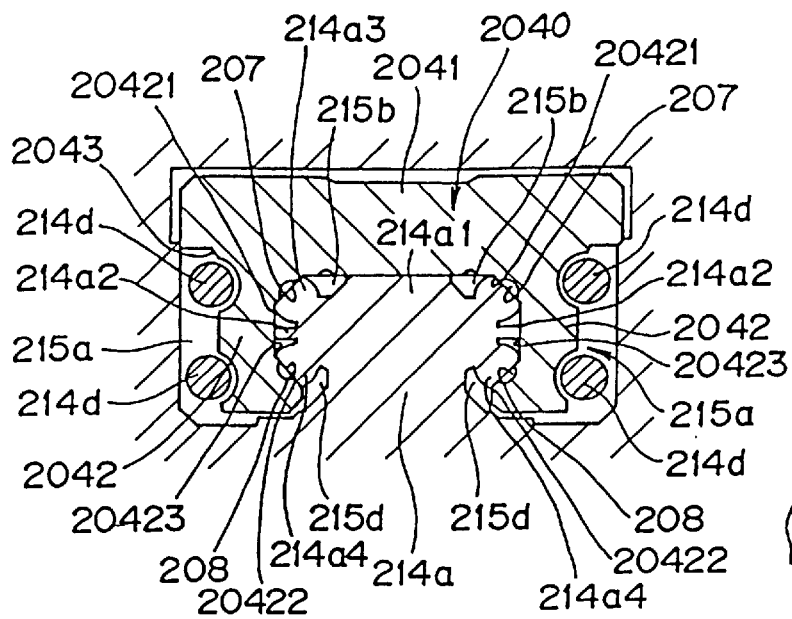
FIG. 6(a) is a cross sectional view of a fixed molding die to which the movable block body is inserted.
Figure 6D:
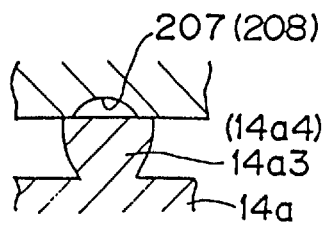
FIG. 6(d) is a view showing a state where the molding material is shut off at side peripheries of the ball rolling groove.
Figure 6B:
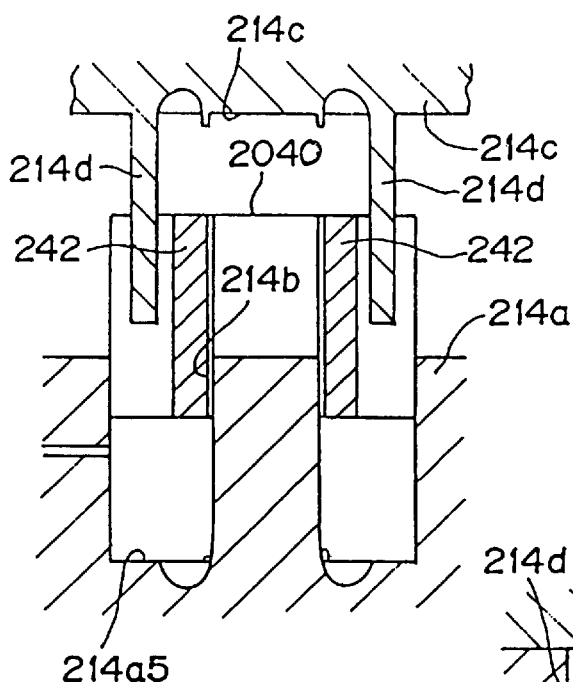
FIG. 6(b) is a longitudinal sectional view showing a molding die in an opened-state.
Figure 6E:
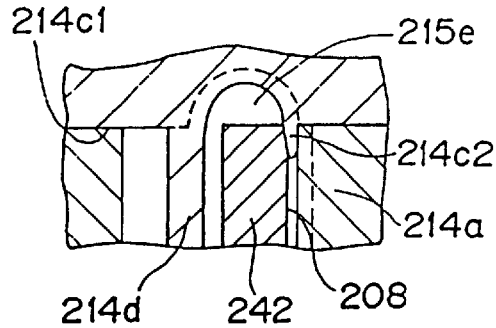
FIG. 6(e) is a schematically and partially cross-sectional view showing a state where the molding material is shut off at both end portions of the ball rolling groove.
Figure 6C:
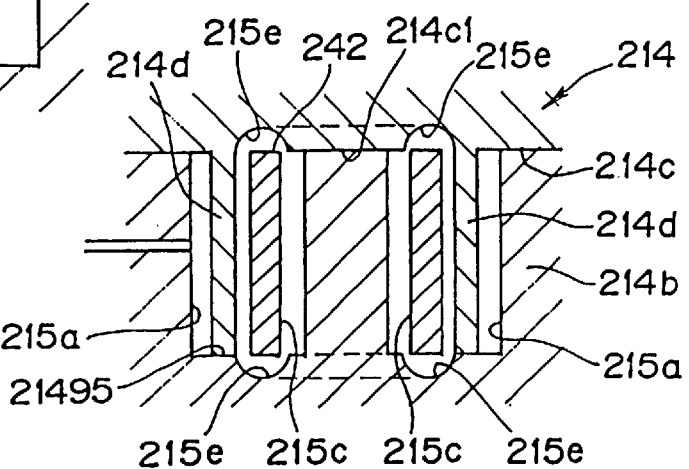
FIG. 6(c) is a longitudinal sectional view showing a molding die in a closed-state.

As shown in FIGS. 6(b), (e), the shutting-off of the molding material at the both end portions of the ball rolling grooves 207, 208 can be performed by the engaging convex portions 214a6, 214c2 to be engaged with the ball guide portion 2048 which had been subjected to a crowning working and provided to both end portions of the ball rolling grooves 207, 208.

According to the present invention described above, the positioning of the movable block body 2040 in width, vertical and longitudinal directions is performed at the plain surface which is different from the ball rolling grooves 207, 208, so that the damage or injure of the ball rolling grooves 207, 208 can be prevented. Further, the movable block body 2040 can be stably positioned by being supported with a large supporting force regardless of the ball rolling grooves 207, 208.

In particular, the positional relation between the cavity 215a for forming the ball returning passage forming member 2091, the cavities 215c–215e for forming the first to third retainer portions 213a–213c and the cavity 215f for forming the direction changing passage inner peripheral piece portion 212 with respect to the movable block body 2040 can be accurately determined.

Third Embodiment

Figure 7A:
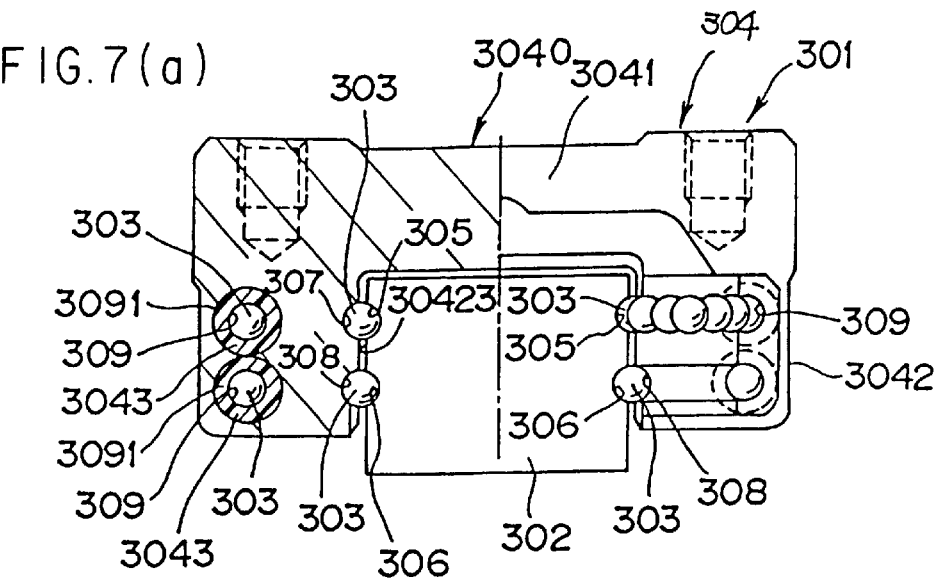
FIG. 7(a) is a front view, half in section, of a movable block in a state where a side cover is detached from the end surface of the movable block.
Figure 7B:
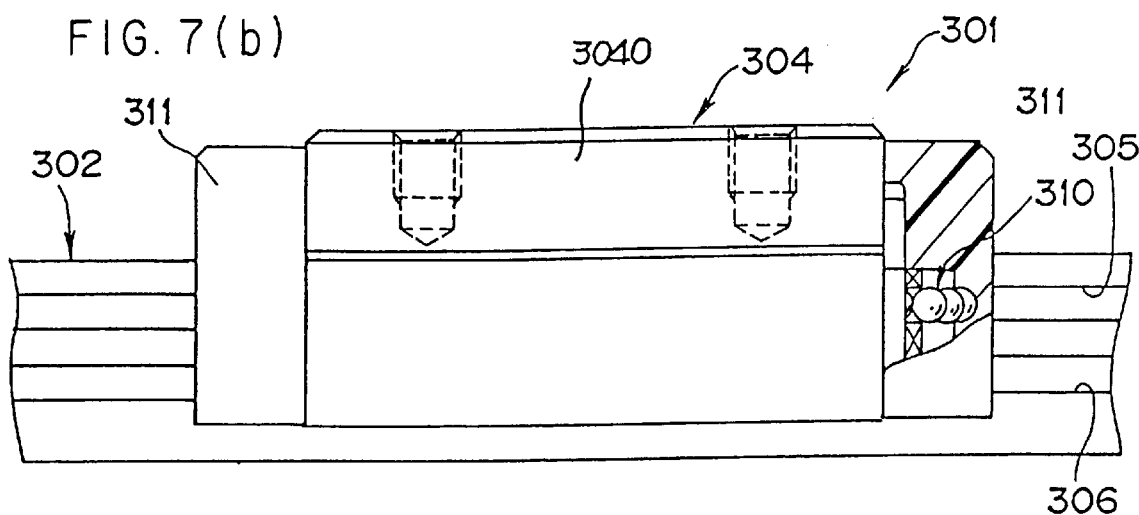
FIG. 7(b) is a side view, partially broken, of the movable block.
Figure 7C:
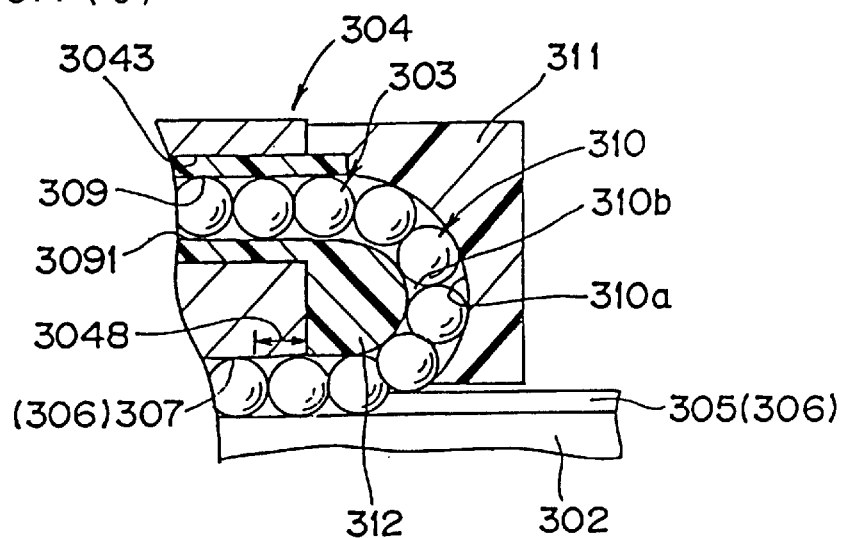
FIG. 7(c) is a partially enlarged cross sectional view showing a direction changing passage.
Figure 8A:
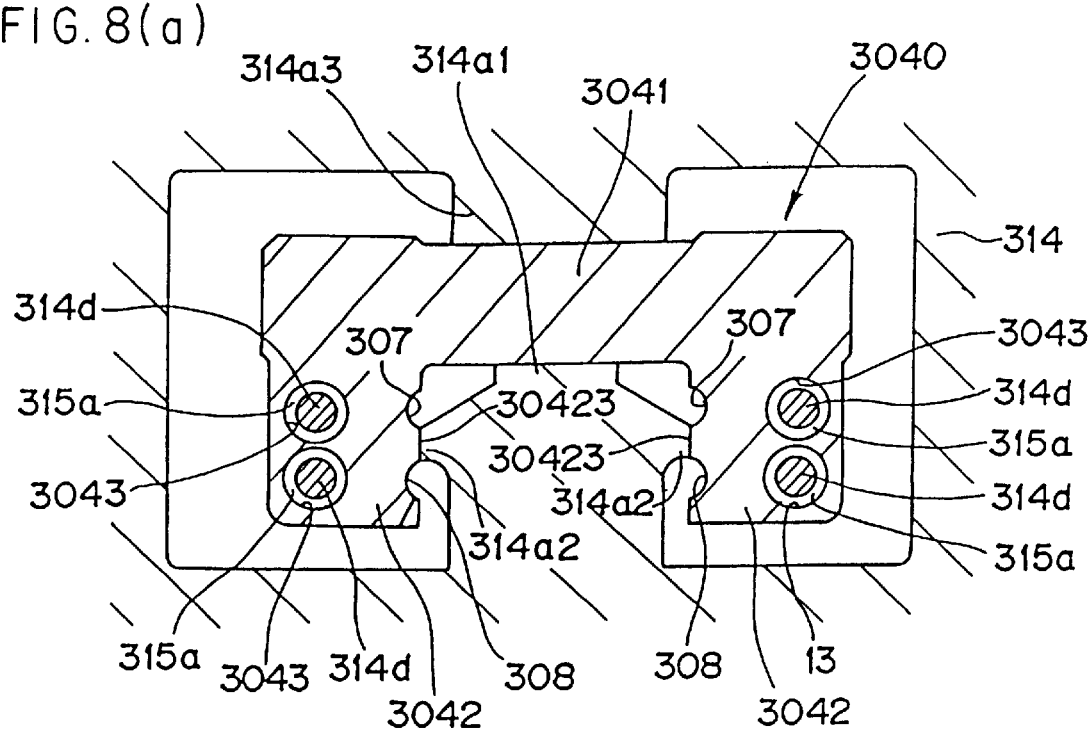
FIG. 8(a) is a cross sectional view of a fixed molding die into which the movable block body is inserted and FIG. 8(b) is a partially omitted longitudinal sectional view showing a molding die in a closed-state.
Figure 8B:
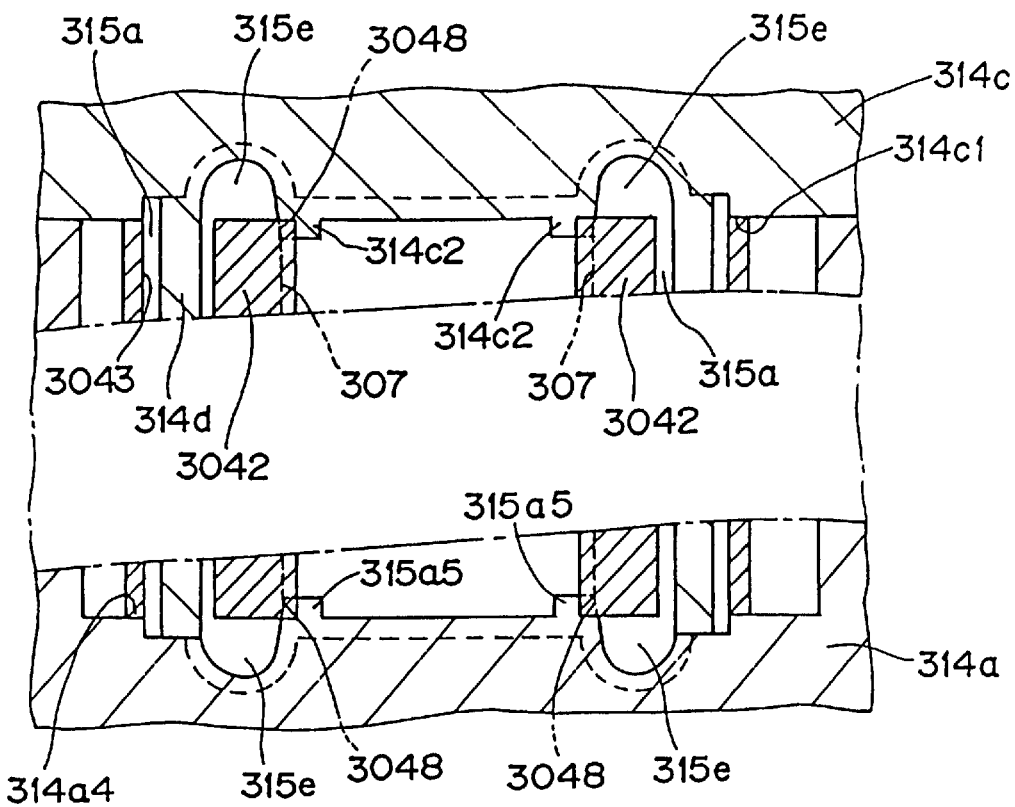

FIGS. 7 and 8 show a third embodiment of the present invention.

The rolling motion guide device 301 is constructed by comprising a track rail 302 and a movable block 304 having a U-shape in section and movably supported by the track rail 302 through four rows, in total, of balls 303 in which two rows of balls are vertically disposed to each of the right and left side surfaces of the track rail 302.

The track rail 302 is an elongated member formed to provide a rectangular shape in section. Each of the right and left side surfaces of the track rail 302 is formed to provide an almost vertical surface and is provided with two rows of ball rolling grooves 305, 306 as the rolling member rolling grooves, respectively.

The movable block 304 is a block body having a high rigidity and a U-shaped cross section and has a movable block body 3040 comprising a horizontal portion 3041 opposing to the upper surface of the track rail 302 and a pair of leg portions 3042 extending downward from both right and left side end portions of the horizontal portion 3041 so as to clamp both the right and left side surfaces of the track rail 302. Each of the inner side surfaces of the right and left leg portions is almost a vertical surface and is formed with two rows of ball rolling grooves 307 and 308 corresponding to the paired ball rolling grooves 305 and 306 formed to the right and left side surfaces of the track rail 302.

The ball rows for receiving loads to be applied between the track rail 302 and the movable block body 3040 are constituted by disposing a number of balls 303 to portions between the four paired ball rolling grooves 305, 307; 306, 308 that mutually correspond to each other and are formed to the opposing surfaces of the movable block body 3040 and the track rail 302. The balls 303 are applied with a predetermined preload. As the rolling member other than balls, rollers or the like can be also applied.

Both end portions of the ball rolling grooves 307, 308 are performed with a crowning-working so as to provide a ball guide portion 3048 having an inclination of which depth gradually increases toward the end portions of the ball rolling grooves. The ball guide portion 3048 has a function of rolling and moving the balls from the direction changing passage 310 in a non-loaded region to portions between the ball rolling grooves 305, 307; 306, 308 in a loaded region by gradually applying the load to the balls.

The right and left leg portions 3042 of the movable block body 3040 are provided with four rows of ball returning passages 309 for circulating and guiding the four rows of balls. The ball returning passage 309 is constituted by a bore linearly extending in parallel to the respective ball rolling grooves 307, 308 formed to the movable block body 3040.

The right and left leg portions 3042 of the movable block body 3040 are formed with a through bore 3043. A return passage forming member 3091 composed of resin for forming the ball returning passage 309 is integrally bonded to the through bore 3043. Upper and lower two rows of the ball returning passage 309, 309 are formed to the return passage forming member 3091.

A side cover 311 constituting the direction changing passage 310 in a U-shaped pipe form for changing the rolling direction of the balls 303 disposed between the track rail 302 and the movable block body 3040 toward the ball returning passage 309 is attached to an end portions of the movable block body 3040. The side cover 311 per se is formed with only an outer peripheral portion 310a of the entire direction changing passage 310 in the U-shaped pipe form. Further, a direction changing passage inner peripheral piece portion 312 as a direction changing inner periphery forming member for forming an inner peripheral portion 310b of the direction changing passage 310 is integrally bonded to the end portions of the movable block body 3040, and the direction changing passage 310 is constituted by the side covers 311 and the direction changing inner peripheral piece portions 312.

The present embodiment is different from the previous first and second embodiments in a point that the side peripheries of the ball rolling grooves 307, 308 formed to the movable block body 3040 is not provided with ball retaining members for preventing the balls 303 from dropping off from the movable block body.

Further, the aforementioned return passage forming member 309 and the direction changing passage inner peripheral piece portion 312 are integrally formed with the movable block body 3040.

This integral molding is performed in accordance with an insert molding method in which a cavity corresponding to the resin molded portion to be formed is formed between an inner peripheral wall of the molding die 314 and the movable block body 3040 by disposing the movable block body 3040 within a molding die 314, and then, the molding material is injected into the cavity.

FIG. 8 is a schematic view showing an engaging state of the movable block body 3040 and the molding die 314 at the time of the insert molding operation.

A fixed die 314a comprises a first convex portion 314a1 abutting against the lower surface of the horizontal portion 3041 of the movable block body 3040, a second convex portion 314a2 abutting against the vertical surface 30423 of the leg portion 3042, and a third convex portion 314a3 for suppressing the upper surface of the horizontal portion 3041.

The first to third convex portions 314a1–314a3 are not required to be continuously formed to the movable block body 3040 over an entire length thereof, and the convex portions can also be discontinuously formed to the movable block body.

A movable die 314c is provided with a pin 314d for forming the ball returning passage 309.

Further, a cavity 315a for forming the return passage forming member 3091 is provided at the through bore 3043 of the right and left leg portions 3042, and a cavity 315e for forming the direction changing passage inner peripheral piece portion 312 is provided at both front and rear end portions of the movable block body 3040, respectively.

The first to third convex portions 314a1–314a3 support the lower surface of the horizontal portion 3041 of the movable block body 3040, the inner side surfaces 30423 of the leg portions 3042 and the upper surface of the horizontal portion 3041, the respective surfaces being plain surfaces other than a surface having the ball rolling grooves 307, 308, whereby a position of the movable block body 3040 in a width and height directions is determined.

That is, a positioning in a height direction of the movable block body 3040 is performed by the first convex portion 314a1 abutting against the lower surface of the horizontal portion 3041 and the third convex portion 314a3 abutting against the upper surface of the horizontal portion. In addition, a positioning of the movable block body 3040 in a width direction is performed by the second convex portion 314a2 abutting against the inner side surfaces of the right and left leg portions 3042.

On the other hand, the position of the movable block body 3040 in a longitudinal direction is determined by a bottom wall 314a5 of the fixed die 314a and an end wall 314c1 of the movable die 314c against which an elongated end wall in a longitudinal direction of the movable block body 3040 are abutted.

The shutting-off the molding material at both the end portions of the ball rolling grooves 307, 308 can be performed by the engaging convex portions 314a5, 314c2 to be engaged with the ball guide portion 348 which had been subjected to a crowning working and provided to both end portions of the ball rolling grooves 307, 308.

According to the present invention described above, the positioning of the movable block body 3040 in width, vertical and longitudinal directions is performed at the plain surface, which is different from the ball rolling grooves 307, 308, so that the damage or injure of the ball rolling grooves 307, 308 can be prevented. Further, the movable block body 3040 can be accurately positioned to a predetermined position.

In particular, the positional relation between the cavity 315a for forming the ball returning passage forming member 3091 and the cavity 315f for forming the direction changing passage inner peripheral piece portion 312 with respect to the movable block body 3040 can be accurately determined.

When the molding material is shut off at the ball guide portion 348 provided to both the end portions of the ball rolling grooves 307, 307, it becomes possible to prevent the molding materials such as resin or the like from invading into the ball rolling grooves 307, 307, while preventing the damage or injure of the ball rolling grooves.

Fourth Embodiment

Figure 9A:
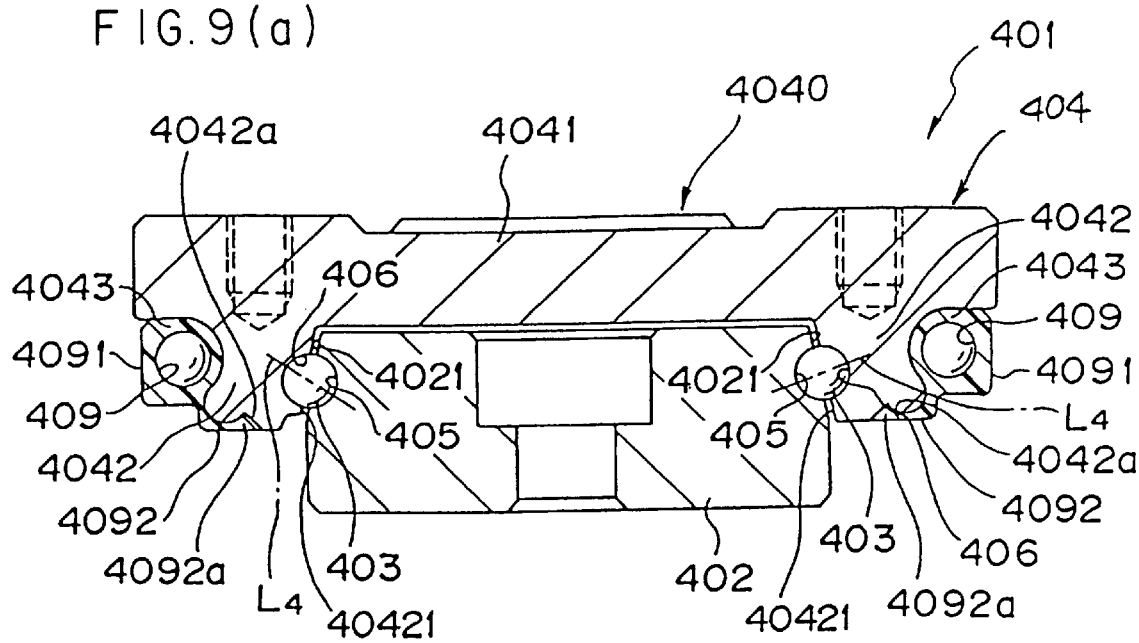
FIG. 9(a) is a cross sectional view in a direction orthogonal to the track rail.
Figure 9B:
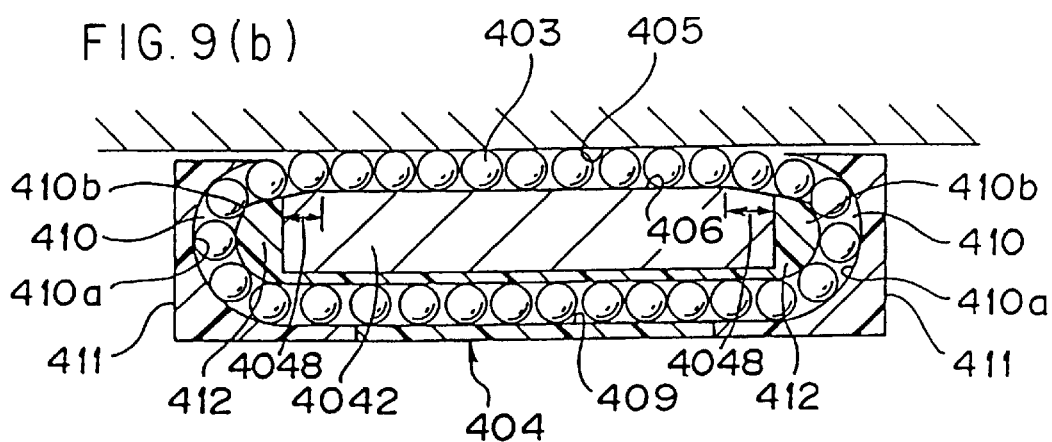
FIG. 9(b) is a view showing a structure of a ball circulating passage.
Figure 9C:
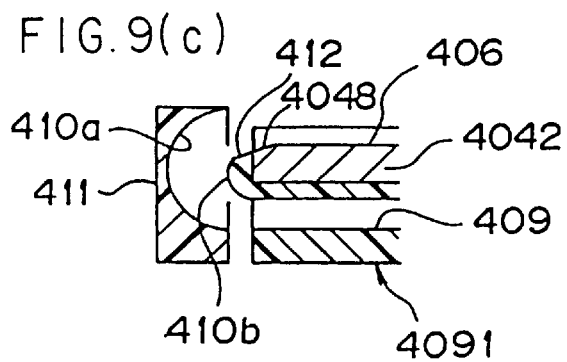
FIG. 9(c) is a partially exploded sectional view showing a direction changing passage.
Figure 10A:
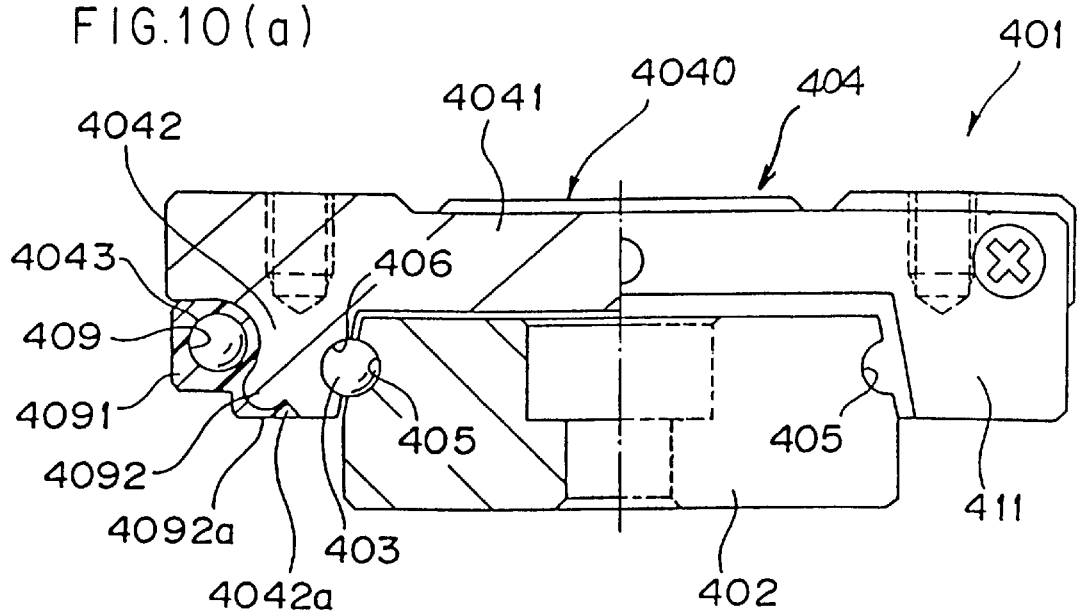
FIG. 10(a) is a front view of a half-sectioned movable block and FIG. 10(b) is a side view of the movable block.
Figure 10B:
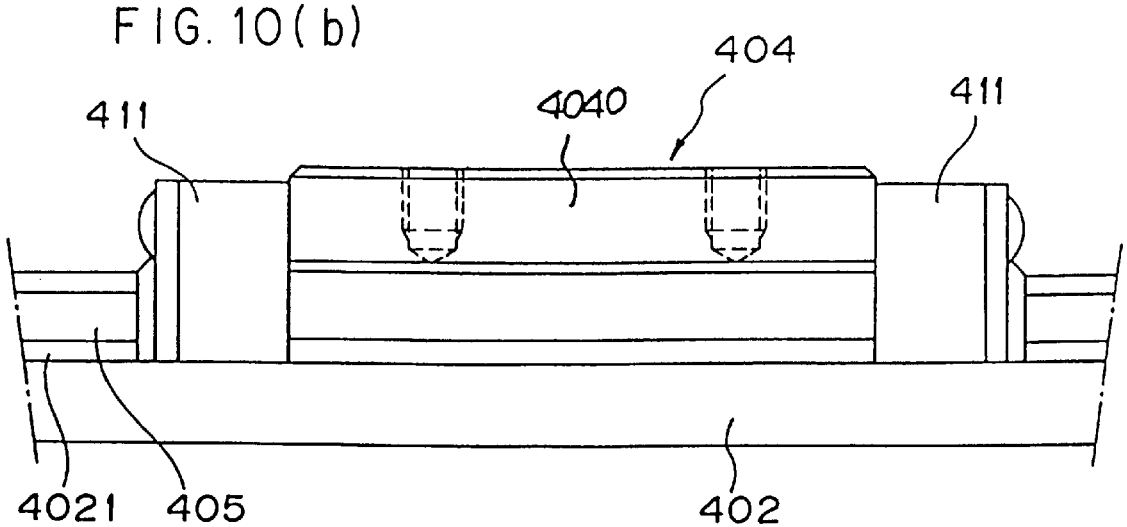
Figure 11A:
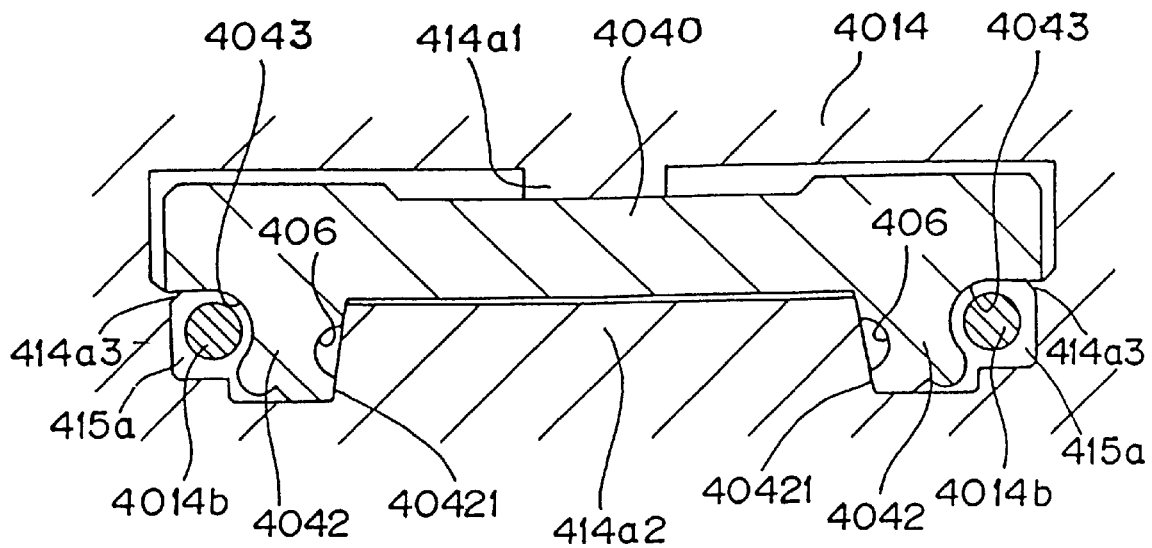
FIG. 11(a) is a cross sectional view of a fixed molding die into which the movable block body is inserted and FIG. 11(b) is a partially omitted longitudinal sectional view showing a molding die in a closed-state.
Figure 11B:
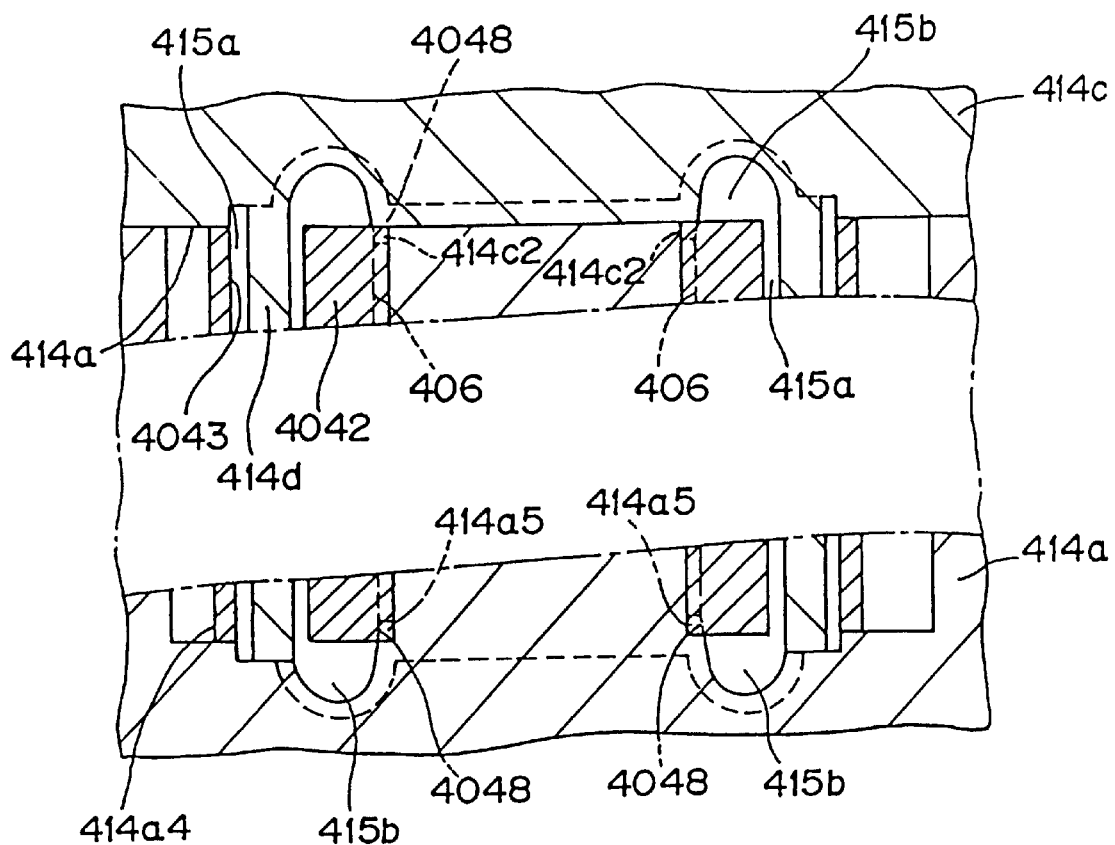

FIGS. 9 to 11 show a fourth embodiment of a rolling motion guide device according to the present invention.

The rolling motion guide device 401 is constructed by comprising a track rail 402 and a movable block 404 having a U-shape in section and movably supported by the track rail 402 through two rows, in total, of balls 403 in which one row of balls is disposed to each of the right and left side surfaces of the track rail 402.

The track rail 402 is composed of an elongated member formed to provide a rectangular shape in section. Upper half portions of both the right and left side surfaces of the track rail 402 are formed to provide tapered surfaces 4021 so that the upper half portions are gradually narrowed inside as the position advances upward. Each of the right and left tapered surfaces 4021 is formed with one row of ball rolling groove 405 as a rolling member rolling groove, respectively.

The movable block 404 is a block body having a high rigidity and a U-shaped cross section and has a movable block body 4040 comprising a horizontal portion 4041 opposing to the upper surface of the track rail 402 and a pair of leg portions 4041 and 4041 extending downward from both right and left side end portions of the horizontal portion 4041 so as to clamp both the right and left side surfaces of the track rail 402. Each of the inner surfaces of the right and left leg portions 4042, 4042 is formed with one row of ball rolling groove 407 corresponding to the ball rolling grooves 405 formed to the right and left side surfaces of the track rail 402. The inner side surfaces 40421 of both the right and left leg portions 405 and 405 provide an outwardly directing inclined surface which inclined in a direction so as to open downwardly.

The ball rows for receiving loads to be applied between the track rail 402 and the movable block 404 are constituted by disposing a number of balls 403 to portions between the two paired ball rolling grooves 405, 407 that mutually correspond to each other and are formed to the opposing surfaces of the movable block 404 and the track rail 402. The balls 403 are applied with a predetermined preload. As the rolling member other than balls 403, rollers or the like can be also applied.

Both end portions of the ball rolling grooves 407 are performed with a crowning-working so as to provide a ball guide portion 4048 having an inclination of which depth gradually increases toward the end portions of the ball rolling grooves. The ball guide portion 4048 has a function of rolling and moving the balls from the direction changing passage 410 in a non-loaded region to portions between the ball rolling grooves 405, 407 in a loaded region by gradually applying the load to the balls.

A contact angle line L4 connecting contact points of the respective balls 403 to the ball rolling grooves 405, 407 is inclined with a predetermined angle of α 4 so as to be gradually lowered toward a center of the track rail 402.

The movable block 404 is provided with two rows of ball returning passages 409 for circulating and guiding the two rows of balls 403. The ball returning passage 409 is constituted by a bore linearly extending in parallel to the respective ball rolling grooves 407 formed to the movable block 404. One row of the ball returning passage 409 is formed to the right and left leg portions 4042, respectively.

Outer side surface lower end corner portions of the right and left leg portions 4042 of the movable block body 4040 are formed with a circular-arc-shaped concave portion 4043 to which a pipe portion 4091 composed of resin for forming the ball returning passage 409 is integrally bonded. The pipe portion 4091 is formed to be continuous to a lower end surface resin portion 4092 covering a lower end surface of the leg portion 4042. A top end of the lower end surface resin portion 4092 is formed with an engaging projection 4092a which engages with an engaging groove 4042a formed to the lower end surface of the leg portion 4042.

A side cover 411 constituting the direction changing passage 410 in a U-shaped-pipe form for changing the rolling direction of the balls 403 disposed between the track rail 402 and the movable block body 4040 toward the ball returning passage 409 is attached to an end portions of the movable block body 4040. The side cover 411 per se is formed with only an outer peripheral portion 410a of the entire direction changing passage 410 in the U-shaped pipe form. Further, a direction changing passage inner peripheral piece portion 412 as a direction changing inner periphery forming member for forming an inner peripheral portion 410b of the direction changing passage 410 is integrally bonded to the end portions of the movable block body 4040, and the direction changing passage 410 is constituted by the side covers 411 and the direction changing inner peripheral piece portions 412.

In addition, the pipe portions 4091 as the return passage forming member and the direction changing inner peripheral piece portion 412 are integrally molded with the movable block body 4040.

This integral molding is performed in accordance with an insert molding method in which a cavity corresponding to the die molded portion to be formed is formed between an inner wall of the molding die and the movable block 4040 by disposing the movable block 4040 within a molding die, and then the molding material is injected into the cavity.

FIG. 11 is a schematic view showing an engaging state of the movable block 4040 and the molding die 414 at the time of the insert molding operation.

A fixed die 414a comprises a first convex portion 414a1 abutting against the upper surface of the horizontal portion 4041 of the movable block 4040, and a second convex portion 414a2. The side surfaces of the second convex portion 414a2 are tightly contacted to outwardly directing inclined surfaces 40421 of the right and left leg portions 4042. Further, each of the outer surfaces of the leg portions 4042 is formed with a concave portion 4043 into which a pin 414b for forming the ball returning passage 409 is inserted.

The fixed die 414a is formed with a step portion 414a3 engaging with a corner portion of the concave portion 4043. A cavity 415a for forming a pipe portion 4091 is formed between the concave portion 4043 and the pin 414b.

Further, a cavity 415b for forming the direction changing passage inner peripheral portion 412 is formed to both the front and rear end portions of the movable block 4040, respectively.

In this embodiment, the upper surface of the horizontal portion 4041 is supported by the first convex portion 414a1, while the lower surface of the horizontal portion 4041 is supported by the second convex portion 414a2, whereby the a position of the movable block 4040 in a height direction is determined. In addition, the inner side surfaces 40421 of the leg portions 4042 of the movable block 4040 are supported by both right and left side surfaces of the second convex portion 414a2, whereby the position of the movable block 4040 in a width direction is determined.

In addition, both the right and left side surfaces of the second convex portion 414a2 are interfitted to the inner side surfaces 40421 of the leg portions 4042 in a wedge form, so that there is no fear of causing burrs at inner peripheries of the ball rolling grooves 407, 407.

Furthermore, the end portions of the movable block 4040 in a longitudinal direction are supported by the bottom surface 414a4 of the fixed die 414a and the end wall 414c1 of the movable die 414c in a die-closing direction, whereby the position of the movable block is determined.

As described above, the position of the movable block 4040 is stably determined in the molding die 414 without causing any backlash, so that the cavity 415a for molding the pipe portion 4091 for forming the ball returning passage 409 can be accurately formed at circumference of the movable block 4040.

In this embodiment, the upper end portions 4043a of the concave portions 4043 formed to outer corner portions of the right and left leg portions 4042 abut against the step portion 414a3 formed to the inner periphery of the molding die 4014, so that the movable block 4040 is supported more stably.

The shutting-off the molding material at the both end portions of the ball rolling groove 407 can be performed by the engaging convex portions 414a5, 414c2 to be engaged with the ball guide portion 4048 which had been subjected to a crowning working and provided to both end portions of the ball rolling groove 407.

Fifth Embodiment

Figure 12A:
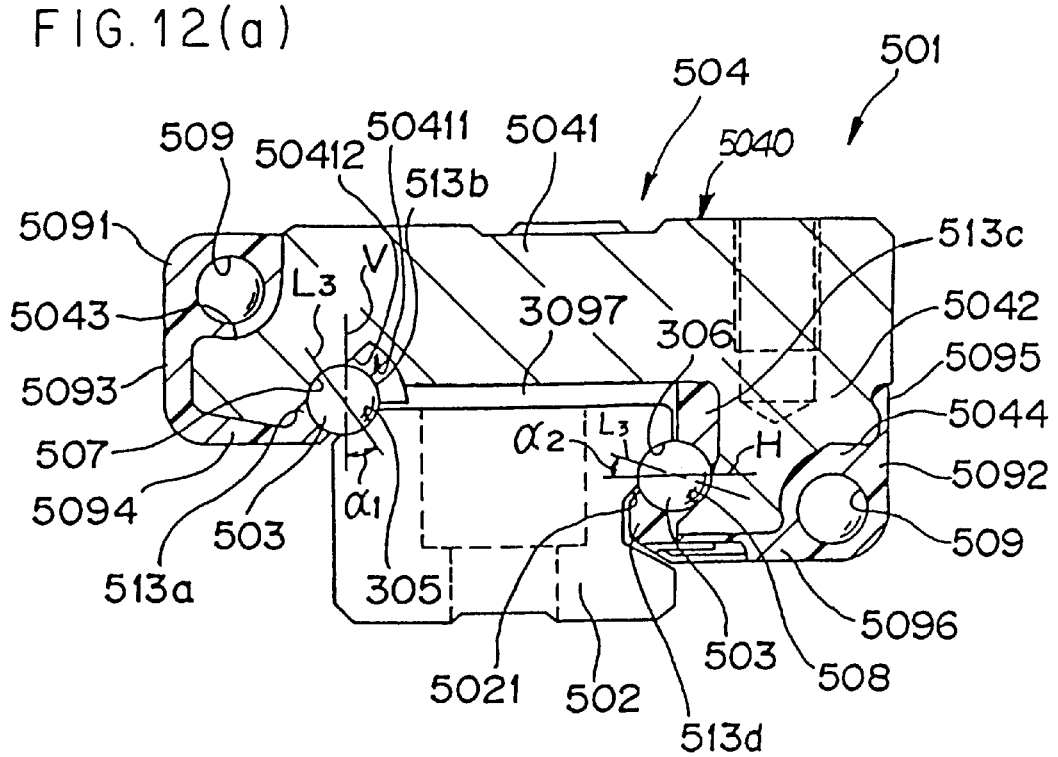
FIG. 12(a) is a cross sectional view in a direction orthogonal to the track rail.
Figure 12B:
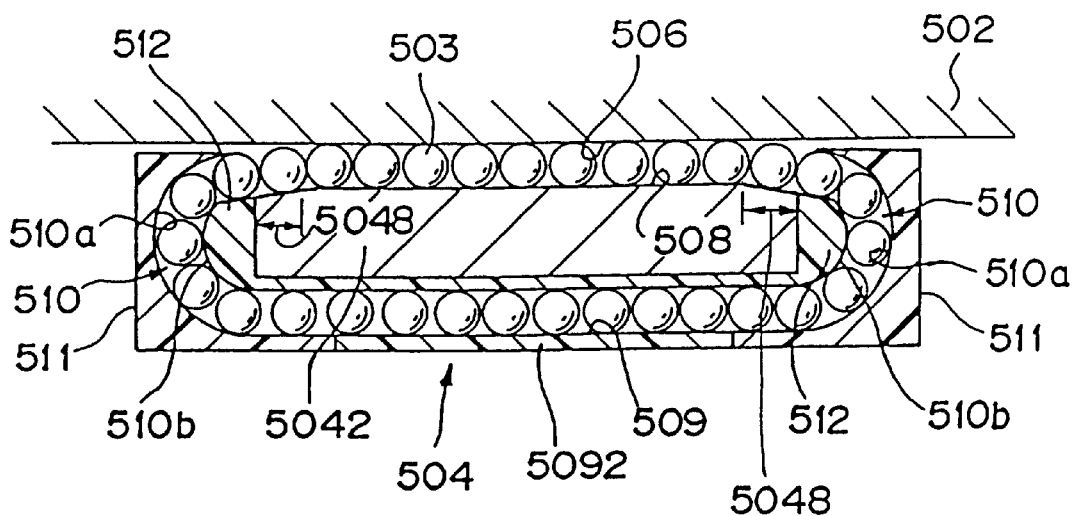
FIG. 12(b) is a view showing a structure of a ball circulating passage.
Figure 12C:
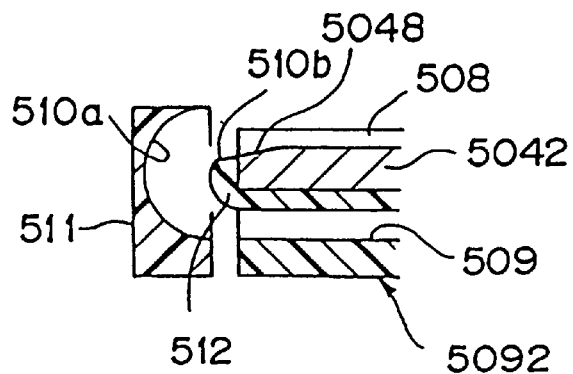
FIG. 12(c) is a partially exploded sectional view showing a direction changing passage.
Figure 13A:
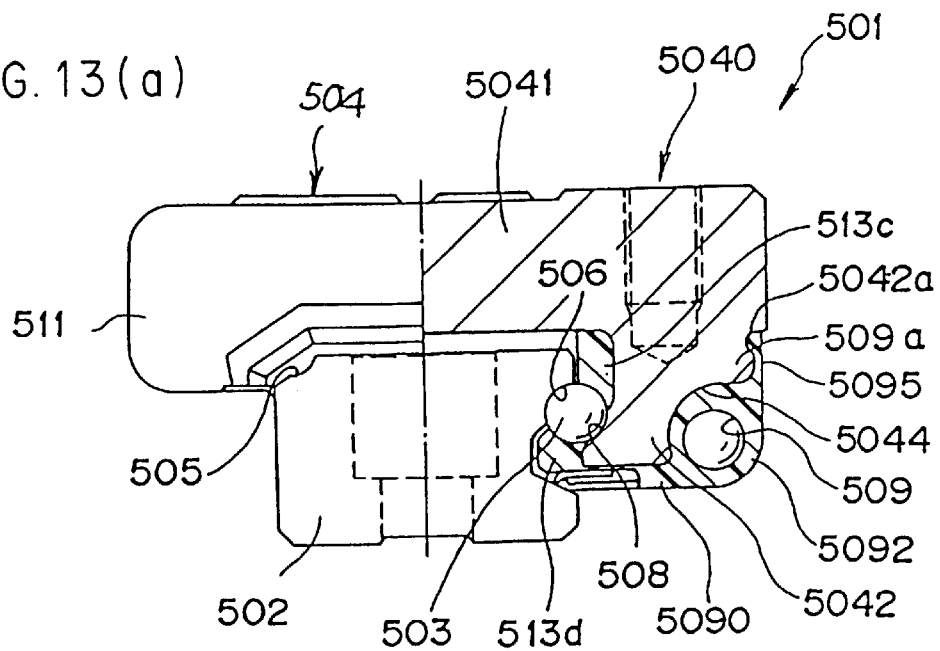
FIG. 13(a) is a front view, half in section, of an end surface of the movable block
Figure 13B:
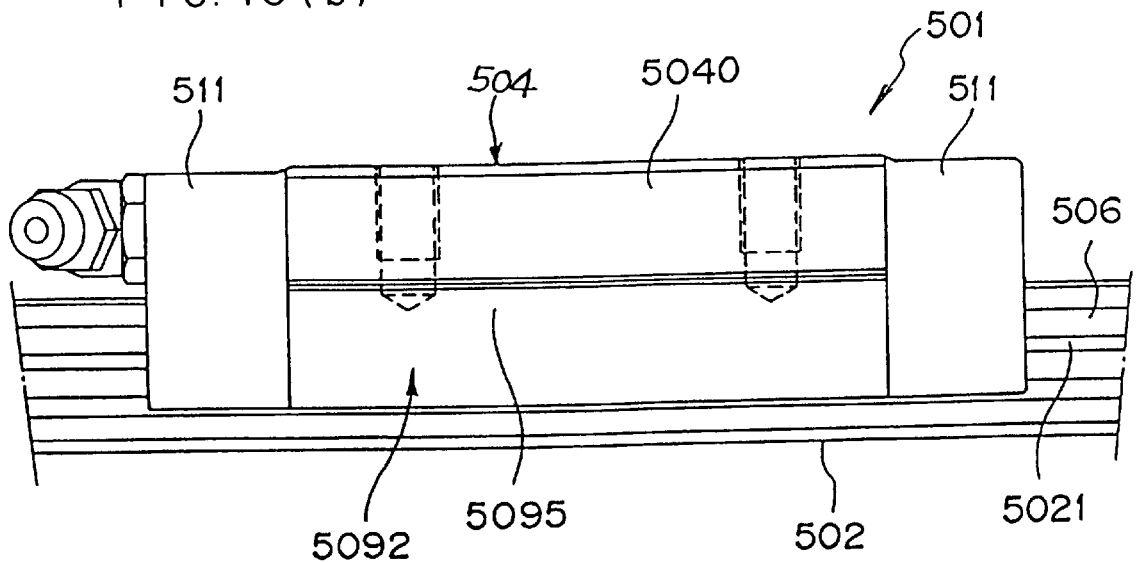
FIG. 13(b) is a side view of the movable block.
Figure 14A:
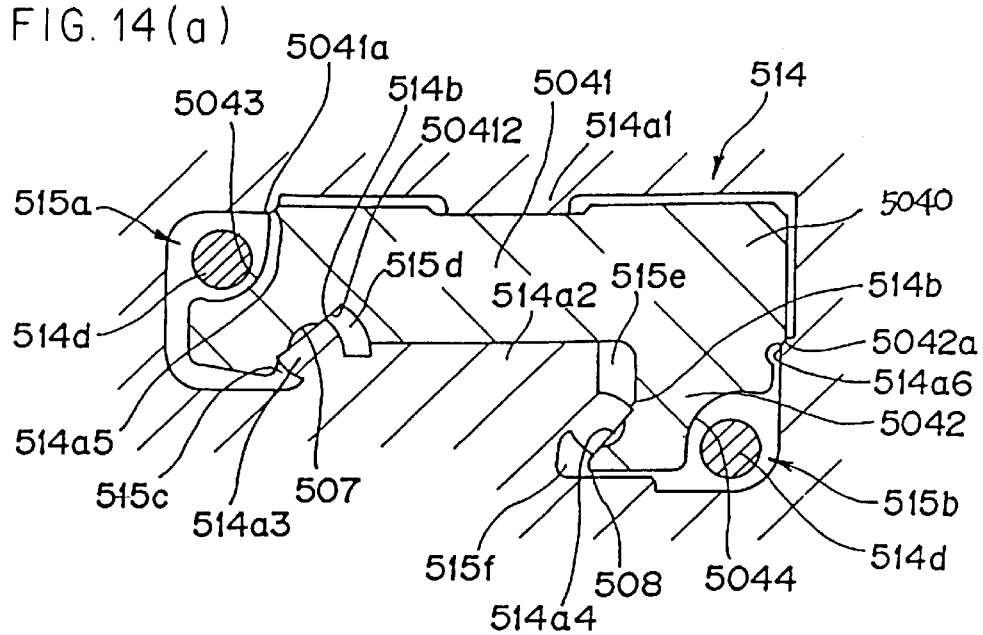
FIG. 14(a) is a cross sectional view of a fixed molding die.
Figure 14B:
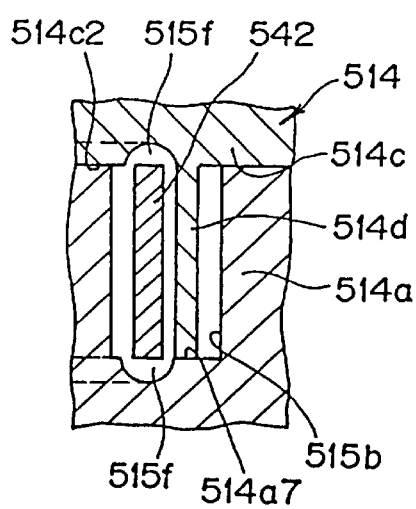
FIG. 14(b) is a partially sectional view, in a longitudinal direction, showing a molding die in a closed-state.
Figure 14C:
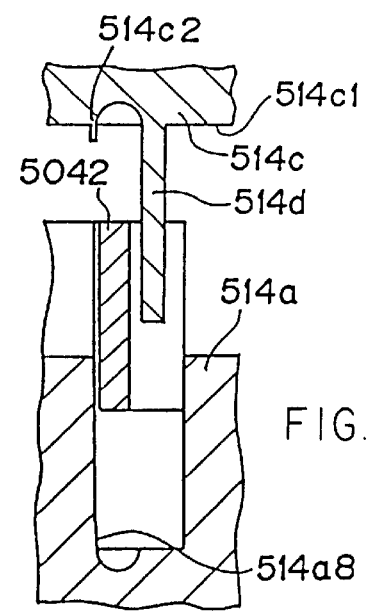
FIG. 14(c) is a partially sectional view, in a longitudinal direction, showing a molding die in an opened-state.
Figure 14D:
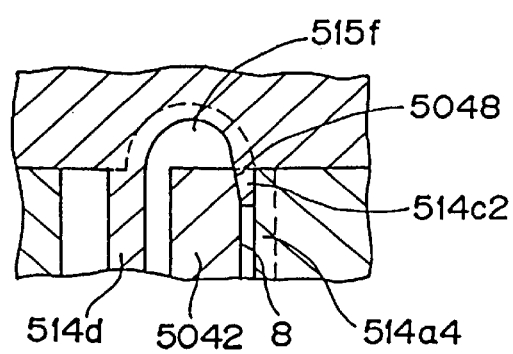
FIG. 14(d) is a partially sectional view showing a state where the molding material is shut off at both end portions of the ball rolling groove.

FIGS. 12 to 14 show a fifth embodiment of a rolling motion guide device according to the present invention.

The rolling motion guide device 501 is constructed by comprising a track rail 502 and a movable block 504 movably supported by the track rail 502 through balls 503 disposed to one side end portion of both the right and left side ends of an upper surface side of the track rail 502 and another balls 503 disposed to the other side end portion of both the right and left side surfaces of the track rail 502.

The track rail 502 is an elongated member formed to provide a rectangular shape in section. One row of ball rolling groove 507 as rolling member rolling groove is formed to a left side end (as shown in figure) of an upper surface of the track rail 502. On the other hand, an upper half portion of a right side surface (as shown in figure) of the track rail 502 is formed to provide a tapered surface 5021 so that the upper half portion gradually protrudes outside as the position advances upward. The tapered surfaces 5021 is formed with one row of ball rolling groove 506 as a rolling member rolling groove.

The movable block 504 is a block body having a high rigidity and an L-shaped cross section and has a movable block body 5040 comprising a horizontal portion 5041 opposing to the upper surface of the track rail 502 and a leg portion 5042 extending downward from the right side end portion of the horizontal portion 5041 so as to oppose to the right side surface of the track rail 502. At the lower surface of the horizontal portion 5041, is formed with a ball rolling groove 507 corresponding to the ball rolling groove 505 formed to the upper surface of the track rail 502, while the inner side surface of the leg portions 5042 is formed with a ball rolling groove 508 corresponding to the ball rolling groove 505 formed to the right and left side surfaces of the track rail 502.

The ball rolling groove 507 to be formed to the lower surface of the horizontal portion 5041 is formed to an inclined upper bottom 50412 of the concave portion 50411 formed to the lower surface of the horizontal portion 5041. Further, a portion close to a lower end portion of the inner side surface of the leg portion 5042 is provided with an inwardly directing inclined surface 50422 which protrudes inside as a position is lowered. The inwardly directing inclined surface 50422 is formed with a ball rolling groove 507.

The ball rows for receiving loads to be applied between the track rail 502 and the movable block body 5040 are constituted by disposing a number of balls 503 to portions between the two paired ball rolling grooves 505, 507; 506, 508 that mutually correspond to each other and are formed to the opposing surfaces of the movable block body 5040 and the track rail 502. The balls 503 are applied with a predetermined preload. As the rolling member other than balls 503, rollers or the like can be also applied.

Both end portions of the ball rolling grooves 507, 508 are performed with a crowning-working so as to provide a ball guide portion 5048 having an inclination of which depth gradually increases toward the end portions of the ball rolling grooves. The ball guide portion 5048 has a function of rolling and moving the balls from the direction changing passage 510 in a non-loaded region to portions between the ball rolling grooves 505, 507; 506, 508 in a loaded region by gradually applying the load to the balls.

With respect to the balls 503 disposed to the upper surface of the track rail 502, a contact angle line L3 connecting contact points of the respective balls 503 to the ball rolling grooves 505, 507 is set so as to provide an inclined line which is counter-clockwisely inclined with a predetermined inclination angle of α 1 with respect to a vertical line V passing through a center of the ball. In contrast, with respect to the balls 503 disposed to the side surface of the track rail 502, a contact angle line L3 connecting contact points of the respective balls 503 to the ball rolling grooves 506, 508 is set so as to provide an inclined line which is clockwisely inclined with a predetermined inclination angle of α 2 with respect to a horizontal line H passing through a center of the ball 503.

The movable block 504 is provided with two rows of ball returning passages 509 for circulating and guiding the two rows of balls 503. The ball returning passage 509 is constituted by a bore linearly extending in parallel to the respective ball rolling grooves 505, 506 formed to the movable block 504. The ball returning passage 509 is formed to a left upper corner portion of the horizontal portion 5041 and to a right lower corner portion of the leg portion 5042, respectively.

An upper left corner portion of the horizontal portion 5041 of the movable block body 5040 is formed with an arc-shaped concave portion 5043 to which a first pipe portion 5091 composed of resin for forming the ball returning passage 509 is integrally bonded. The first pipe portion 5091 is formed to be continuous to a side surface resin portion 5093 covering a left side surface of the horizontal portion 5041 and to a lower surface resin portion 5094 covering a left lower surface of the horizontal portion 5041.

On the other hand, a right lower corner portion of the leg portion 5042 of the movable block body 5040 is formed with a concave portion 5044 to which a second pipe portion 5092 composed of resin for forming the ball returning passage 509 is integrally bonded. The second pipe portion 5092 is formed to be continuous to a side surface resin portion 5095 covering an outer side surface of the leg portion 5042 and to an end surface resin portion 5094 covering a lower end surface of the leg portion 5042.

A side cover 511 constituting the direction changing passage 510 in a U-shaped-pipe form for changing the direction of the balls 503 disposed between the track rail 502 and the movable block body 5040 toward the ball returning passage 509 is attached to an end portion of the movable block body 5040. The side cover 511 per se is formed with only an outer peripheral portion 510a of the direction changing passage 510 in the U-shaped pipe form. Further, a direction changing passage inner peripheral piece portion 512 as a direction changing inner periphery forming member for forming an inner peripheral portion 510b of the direction changing passage 510 is integrally bonded to the end portion of the movable block 504, and the direction changing passage 510 is constituted by the side covers 511 and the direction changing inner peripheral piece portions 512.

In addition, the movable block body 5040 is provided with ball retaining members 513 along the two rows of balls 503 for preventing the balls 503 from dropping off from the movable block body 5040 when the movable block body 5040 is detached from the track rail 502. The ball retaining members 513 are composed of resin and comprise a pair of first and second retainer portions 513a and 513b extending so as to clamp both side peripheries of the ball rolling groove 507 formed to the horizontal portion 5041, and a pair of third and fourth retainer portions 513c and 513d extending so as to clamp both side peripheries of the ball rolling groove 508 formed to the leg portion 5042.

The first retainer portions 513a is formed to be continuous to a left lower surface covering portion 5094, and is integrally formed with the first pipe portion 5091. The second retainer portion 513b and the third retainer portion 513c are formed to be continuous through a center lower surface covering portion 5097 which covers the lower surface of the horizontal portion 5041. Further, the fourth retainer portions 513d is formed to be continuous to an end surface covering portion 5096 and is integrally formed with the second pipe portion 5092.

On the other hand, at periphery portions of the first to third retainer portions 513a–513c contacting to the ball rolling grooves, a plain portion 547 is exposed to a portion between side peripheries of the ball rolling grooves 507, 508. The convex portion for preventing the molding material from invading into the ball rolling grooves 507, 508 at the time of the insert molding operation is abutted against the plain portion 547.

In addition, all of the first and second pipe portions 5091, 5092 as the return passage forming member, the first to fourth retainer portions 513a–513d as the ball retaining member 513 and the direction changing inner peripheral piece portion 512 is integrally molded with the movable block body 5040.

This integral molding is also performed in accordance with the insert molding method in which a cavity corresponding to the die molded portion to be formed is formed between an inner wall of the molding die and the movable block body 5040 by disposing the movable block body 5040 within a molding die with reference to the ball rolling grooves 507, 508 formed to the movable block body 5040, and then the molding material is injected into the cavity.

FIG. 14 is a schematic view showing an engaging state of the movable block body 5040 and the molding die 514 at the time of the insert molding operation. A fixed die 514a of the molding die comprises first and second convex portions 514a1, 514a2 abutting against the lower surface of the horizontal portion 5041 of the movable block body 5040, a third convex portion 514a3 abutting against the upper bottom portion 50412 of the concave portion formed to the horizontal portion 5041 and engaging with both the side peripheries of the ball rolling groove 507, and a fourth convex portion 514a4 engaging with the inwardly directing inclined surface 50422 of the inner side surfaces of the leg portion 5042.

The first convex portion 514a1 and the second convex portions 514a2 are not required to be continuously formed to the movable block body 5040 over an entire length thereof, and the convex portions can also be discontinuously formed to the movable block body 5040. However, the third convex portion 514a3 and the fourth convex portions 514a4 are required to be continuously formed to the movable block body 5040 over an entire length of the ball rolling grooves 507, 508.

A pin 514d is inserted into the concave portion 5043 formed to the left upper corner portion of the horizontal portion 5041, whereby a cavity 515a for forming the first pipe portion 5091 is formed. Further, a pin 514d is also inserted into the concave portion 5044 formed to the outer side surface of the leg portion 5042 of the movable block body 5040, whereby a cavity 515b for forming the second pipe portion 5092 in the concave portion 5045 is formed.

A first step portion 514a5 abutting against an upper end portion of the concave portion 5043 formed to the left upper corner portion of the horizontal portion 5041, and a second step portion 514a6 abutting against an upper end portion of the concave portion 5044 formed to the right lower corner portion of the leg 5042 are provided to the inner periphery of the fixed die 514a.

Cavities 515c–515f for forming the first to fourth retainer portions 513a–513d are provided at the horizontal portion 5041 and an inner circumference of the leg portion 5042. Further, a cavity 515f for forming the direction changing passage inner peripheral piece portion 512 is provided at both the front and rear end portions of the movable block body 5040, respectively.

In this embodiment, the upper surface of the horizontal portion 5041 of the movable block body 5040 is supported by the first convex portion 514a1, while the lower surface of the horizontal portion 5041 is supported by the second convex portion 514a2, whereby the position of the movable block body 5040 in a height direction is determined.

Further, the position of the movable block body 5040 in a width direction is determined by the third convex portion 514a3, the fourth convex portions 514a4, the first step portion 514a5 and the second step portion 514a6.

In addition, by the action of the third and fourth convex portions 514a3 and 514a4, the molding material can be prevented from invading into the ball rolling grooves 507, 508 formed to the movable block body 5040. As described above, the position of the movable block body 5040 is determined in the molding die 514 to a predetermined position.

On the other hand, the position of the movable block body 5040 in a longitudinal direction is determined by being supported by a bottom wall 514a5 of the fixed die 514a and an end wall portion 514c1 of the movable die 514c.

The shutting-off of the molding material at the both end portions of the ball rolling grooves 507, 508 can be performed by the engaging convex portions 514a8, 514c2 to be engaged with the direction changing guide portion 548 which had been subjected to a crowning working and provided to both end portions of the ball rolling grooves 507, 508.

According to the present invention described above, the positioning of the movable block body 5040 in width, vertical and longitudinal directions is performed at plain surfaces that are different from the ball rolling grooves 507, 508, so that the damage or injure of the ball rolling grooves can be prevented.

In addition, since the molding material is shut off at either both end portions or side peripheries of the ball rolling grooves 507, 508, the molding material can be prevented from invading into the ball rolling grooves 507, 508.

Accordingly, the movable block body 5040 can be stably positioned by being supported with a large supporting force regardless of the ball rolling grooves 507, 508.

As described above, according to the present invention, the positioning of the movable block body in a width, vertical, and longitudinal directions is performed at the plain surface which is different from the rolling member rolling groove, so that the damage or injure of the rolling member rolling groove can be prevented.

In addition, since the molding material is shut off at either both end portions or both side peripheries of the rolling member rolling grooves, the molding material can be prevented from invading into the rolling member rolling grooves.

Accordingly, the movable block body can be stably positioned by being supported with a large supporting force regardless of the rolling member rolling grooves.

INDUSTRIAL APPLICABILITY

As described above, the method of molding a movable block for a rolling motion guide device according to the present invention is effective to a movable block used for various rolling motion guide devices such as linear guide device, ball spline, ball bush or the like in which the movable block is movably assembled to a track rail through various rolling members and particularly effective for the integral molding of a resin portion with the movable block body.

What is claimed is:

1. A method of molding a movable block for a rolling motion guide device comprising a track rail formed with rolling member rolling grooves, a movable block having rolling member rolling grooves opposing said rolling member rolling grooves formed in said track rail, said movable block being movably provided along said track rail and a row of rolling members disposed between the opposing rolling member rolling grooves formed in said track rail and the movable block, wherein a circulation passage for circulating the rows of rolling members is formed to said movable block, at least a part of said circulation passage is constituted by a die-molded portion, and said die-molded portion is integrally molded with a movable block body by an inserting molding method in which said movable block is disposed in a molding die, the method comprising the steps of:

positioning said movable block body in a width direction and in a vertical direction in the molding die by supporting said movable block body with a die portion abutting against a plain surface of said movable block body having no rolling member rolling groove of said movable block body;

positioning said movable block body in a longitudinal direction by supporting both end surfaces in a longitudinal direction of said movable block body;

preventing a molding material from invading into said rolling member rolling grooves by shutting off the molding material at both side peripheries of said rolling member rolling grooves; and integrally molding said die-molded portion with the movable block body.

2. A method of molding a movable block for a rolling motion guide device according to claim 1, wherein said movable block body comprises a horizontal portion extending in a width direction and in a longitudinal direction and a pair of leg portions protruding in a height direction from both the end portions in a width direction of said horizontal portion so as to oppose to side surfaces of said track rail, and in a case where inner side surfaces of said leg portions have inclined surfaces extending toward the protruded portions of said leg portions and gradually inclined toward a side of the track rail, said movable block body is positioned within the molding die in a width direction and in a height direction by supporting at least the inclined surfaces of both the inner side surfaces of both the leg portions and a lower surface of said horizontal portion.

3. A method of molding a movable block for a rolling motion guide device according to claim 1, wherein said movable block body comprises a horizontal portion extending in a width direction and in a longitudinal direction, and a pair of leg portions protruding in a height direction from both the end portions in a width direction of said horizontal portion so as to oppose to side surfaces of said track rail, and in a case where inner side surfaces of said leg portions have an almost vertical surfaces, said movable block body is positioned in a width direction and in a height direction by supporting at least the vertical surfaces of both the inner side surfaces of both the leg portions and both upper and lower surfaces of said horizontal portion.

4. A method of molding a movable block for a rolling motion guide device according to claim 1, wherein said movable block body comprises a horizontal portion extending in a width direction and in a longitudinal direction and a pair of leg portions protruding in a height direction from both the end portions in a width direction of said horizontal portion so as to oppose to side surfaces of said track rail, and in a case where inner side surfaces of said leg portions have inclined surfaces extending toward the protruded portions of said leg portions and gradually inclined toward a side opposite to said track rail, said movable block body is positioned in a width direction and in a height direction by supporting at least the inclined surfaces of both the inner side surfaces of both the leg portions and an upper surface of said horizontal portion.

5. A method of molding a movable block for a rolling motion guide device according to claim 1, wherein said movable block body comprises a horizontal portion extending in a width direction and in a longitudinal direction and a leg portion protruding in a height direction from one end portion in a width direction of said horizontal portion so as to oppose to one side surface of said track rail, and in a case where an inner side surface of said leg portion has an almost vertical surface or an inclined surface extending toward a protruded end portion and gradually inclined to a side of said track rail, said movable block body is positioned within the molding die in a width direction and in a height direction by supporting at least the vertical surface or the inclined surface of the inner side surfaces and outer side surfaces of said leg portion and both upper and lower surfaces of said horizontal portion.

6. A method of molding a movable block for a rolling motion guide device according to any one of claims 1 to 5, wherein said positioning in a longitudinal direction of said movable block body in the molding die is performed by supporting a direction changing guide portion formed to both end portions of said rolling member rolling groove of said movable block body.

7. A method of molding a movable block for a rolling motion guide device according to claim 1, wherein said circulation passage comprises a rolling member rolling groove to be formed to said movable block, a rolling member return passage to be formed in parallel to said rolling member rolling groove, and a direction changing passage for connecting said rolling member rolling groove to said rolling member return passage, wherein said die molded portion constitutes at least one of a rolling member retaining portion to be formed at both side peripheries of said rolling member rolling groove, a return passage forming portion for forming said rolling member return passage, and a direction changing inner peripheral guide forming portion for forming an inner peripheral portion of said direction changing passage.

\* \* \* \* \*